US012737850B2

(12) United States Patent
Tangade et al.

(10) Patent No.: US 12,737,850 B2
(45) Date of Patent: Sep. 15, 2026

(54) FUSING SIMULATED AND REAL-WORLD DATA

(71) Applicant: NVIDIA Corporation, Santa Clara, CA (US)

(72) Inventors: Sameer Suresh Tangade, Karanja Lad (IN); Ajay Shrawan Meshram, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 57 days.

(21) Appl. No.: 18/949,345

(22) Filed: Nov. 15, 2024

(65) Prior Publication Data

US 2026/0141483 A1 May 21, 2026

(51) Int. Cl.

*G06T 5/50* (2006.01)
*B60T 7/12* (2006.01)
*B60W 30/09* (2012.01)
*B60W 30/095* (2012.01)

(52) U.S. Cl.

CPC .................. *G06T 5/50* (2013.01); *B60T 7/12* (2013.01); *B60W 30/09* (2013.01); *B60W 30/095* (2013.01); *B60T 2201/022* (2013.01)

(58) Field of Classification Search

CPC ........ G06T 5/50; B60T 7/12; B60T 2201/022; B60W 30/09; B60W 30/095

See application file for complete search history.

(56) References Cited

U.S. PATENT DOCUMENTS

| | | | | |
|---|---|---|---|---|
| 7,148,917 | B2 * | 12/2006 | Klapman | H04N 7/15 348/E7.083 |
| 9,905,196 | B2 | 2/2018 | Pajak et al. | |
| 10,257,449 | B2 | 4/2019 | Avadhanam et al. | |
| 10,817,983 | B1 * | 10/2020 | Da Silva Quelhas | G06T 15/503 |
| 11,475,626 | B2 * | 10/2022 | Holzer | G06F 17/18 |
| 11,688,074 | B2 | 6/2023 | Puri et al. | |
| 2020/0030261 | A1 | 1/2020 | Wainer et al. | |
| 2021/0193083 | A1 * | 6/2021 | Suzuoki | G09G 5/14 |
| 2023/0282005 | A1 | 9/2023 | Park et al. | |

* cited by examiner

*Primary Examiner* — Gevell V Selby
(74) *Attorney, Agent, or Firm* — IRON SUMMIT IP LLP

(57) ABSTRACT

In various examples, techniques for blending simulated and real-world data for semi-autonomous and/or autonomous systems and applications are described herein. Systems and methods described herein may obtain real images captured using one or more image sensors of a machine navigating within an environment along with simulated images captured using a simulation of the environment. As described herein, in some examples, the real images may be associated with a first level of lighting while the simulated images are associated with a second, greater level of lighting. Systems and methods are then described that generate blended images by at least blending the real images with the simulated images. In some examples, different weights may be used to perform the blending, such as first weights that are applied to the real images and second weights that are applied to the simulated images. A machine may then perform operations using the blended images.

20 Claims, 17 Drawing Sheets

900

RECEIVE IMAGE DATA OBTAINED USING ONE OR MORE IMAGE SENSORS OF A MACHINE, THE IMAGE DATA REPRESENTING A REAL-WORLD IMAGE OF AN ENVIRONMENT
B902

OBTAIN, USING A SIMULATED ENVIRONMENT ASSOCIATED WITH THE ENVIRONMENT, SIMULATION DATA REPRESENTING A SIMULATED IMAGE OF THE ENVIRONMENT
B904

DETERMINE A FIRST WEIGHT ASSOCIATED WITH THE REAL-WORLD IMAGE AND A SECOND WEIGHT ASSOCIATED WITH THE SIMULATED IMAGE
B906

GENERATE, BASED AT LEAST ON BLENDING THE REAL-WORLD IMAGE WITH THE SIMULATED IMAGE USING THE FIRST WEIGHT AND THE SECOND WEIGHT, A BLENDED IMAGE OF THE ENVIRONMENT
B908

CAUSE THE MACHINE TO PERFORM ONE OR MORE OPERATIONS BASED AT LEAST ON THE BLENDED IMAGE
B910

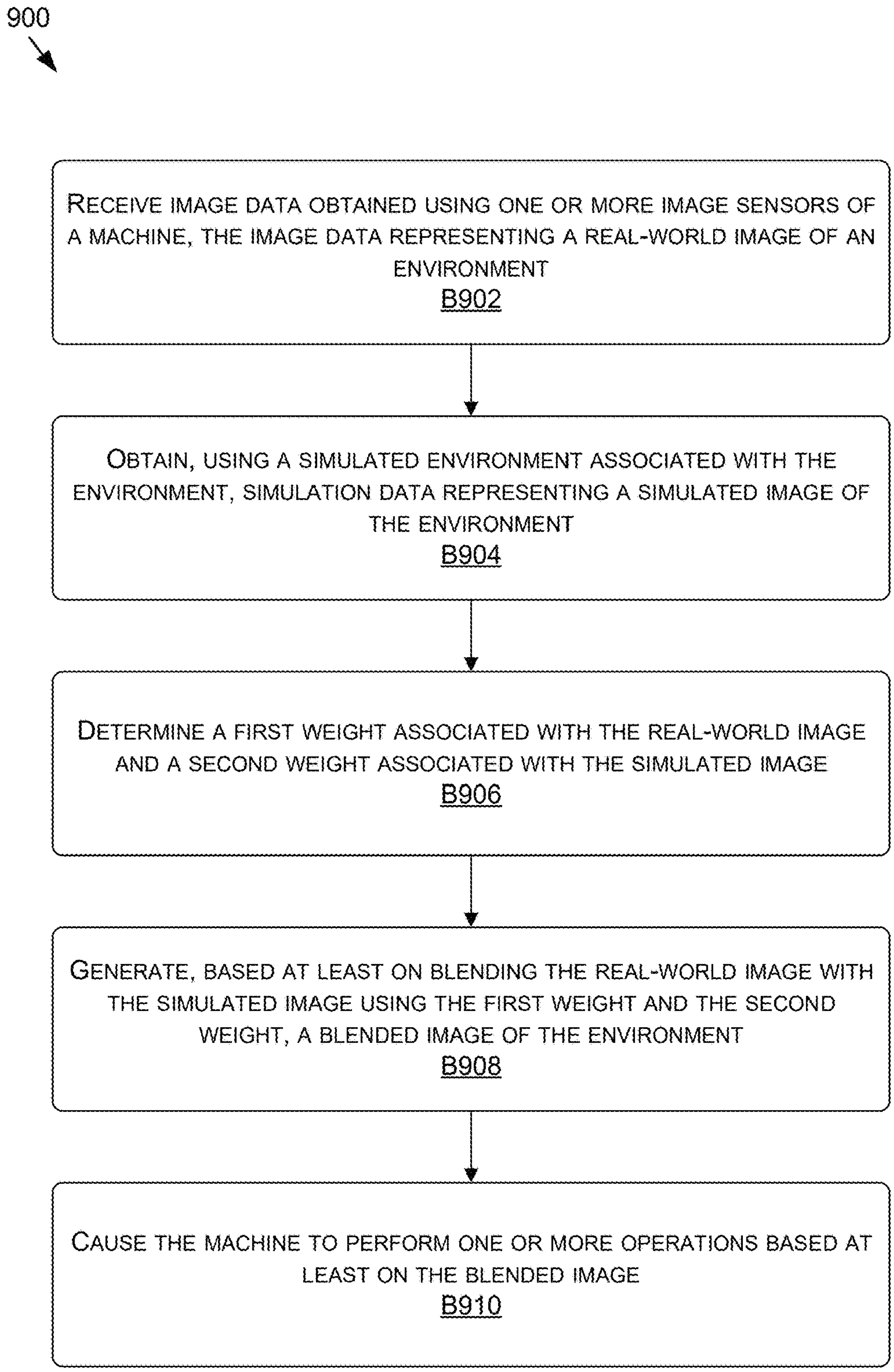

FIGURE 9

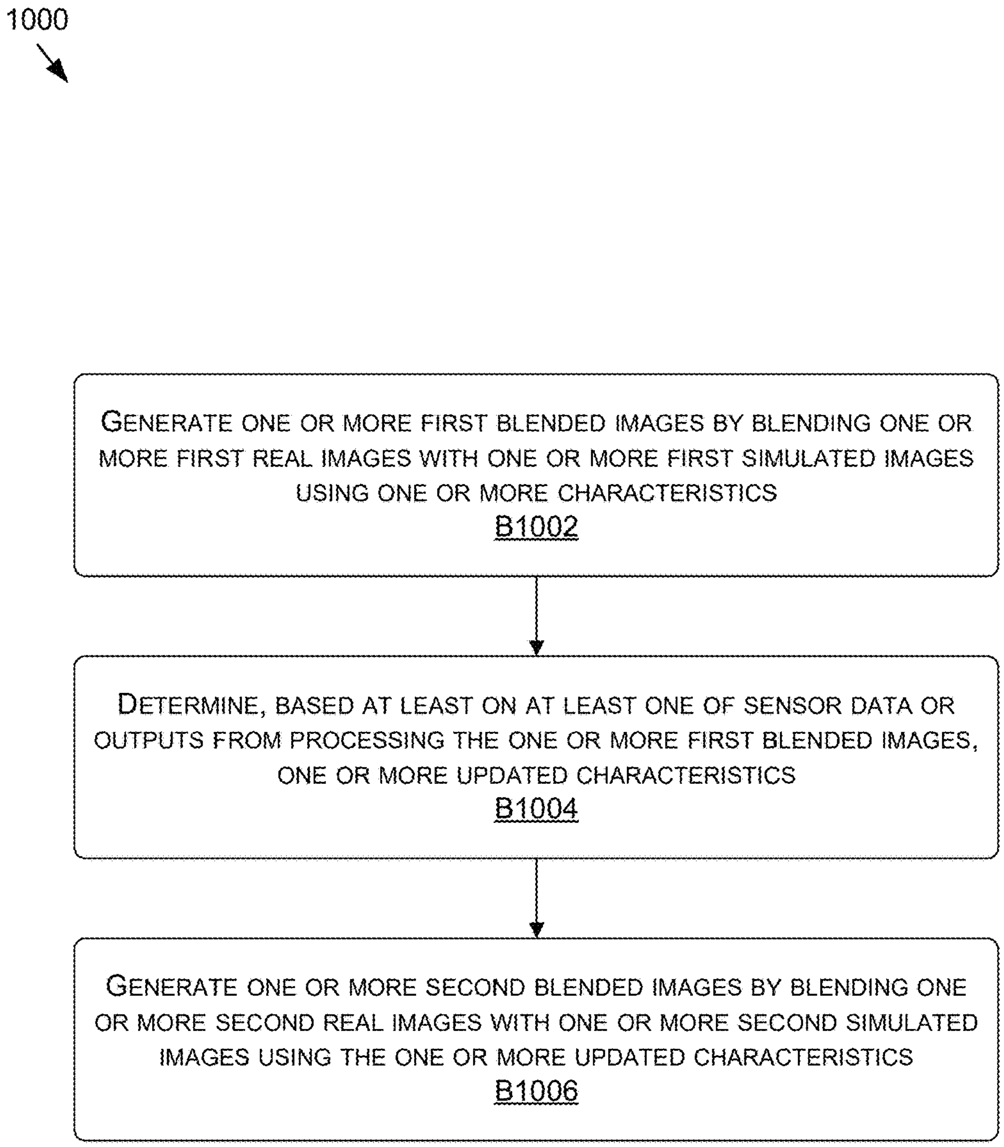

FIGURE 10

GENERATE ONE OR MORE FIRST BLENDED IMAGES BY BLENDING ONE OR MORE FIRST REAL IMAGES WITH ONE OR MORE FIRST SIMULATED IMAGES USING ONE OR MORE CHARACTERISTICS
B1002

DETERMINE, BASED AT LEAST ON AT LEAST ONE OF SENSOR DATA OR OUTPUTS FROM PROCESSING THE ONE OR MORE FIRST BLENDED IMAGES, ONE OR MORE UPDATED CHARACTERISTICS
B1004

GENERATE ONE OR MORE SECOND BLENDED IMAGES BY BLENDING ONE OR MORE SECOND REAL IMAGES WITH ONE OR MORE SECOND SIMULATED IMAGES USING THE ONE OR MORE UPDATED CHARACTERISTICS
B1006

1100

APPLY ONE OR MORE SECOND WEIGHTS TO SECOND VALUES ASSOCIATED WITH SECOND PIXELS OF A SIMULATED IMAGE TO DETERMINE SECOND UPDATED VALUES
B1104

GENERATE A BLENDED IMAGE BASED AT LEAST ON THE FIRST UPDATED VALUES AND THE SECOND UPDATED VALUES
B1106

FUSING SIMULATED AND REAL-WORLD DATA

BACKGROUND

For machines (e.g., autonomous vehicles, semi-autonomous vehicles, robots, etc.) to operate safely in environments, the machines must be capable of effectively perceiving areas of the environments that at least partially surround the machines. For example, a machine operating in a warehouse environment must be capable of perceiving objects located within the warehouse environment such that the machine is able to avoid collisions while navigating. To perceive the surrounding environments, machines may process various types of sensor data—such as image data representing images depicting the surrounding environments—using various techniques. For example, a machine may process image data using one or more machine learning models that are trained to perform specific tasks, such as object detection, object classification, object motion prediction, machine localization, trajectory planning, and/or the like.

As such, many factors may affect the ability of the machines to perceive the surrounding environments, such as the lighting conditions within the environments. For instance, inadequate lighting in environments—such as those caused by power outages, equipment failure, poor design, and/or lighting changes based on different time intervals (e.g., turning lights off at night)—may impair the machines' ability to perceive the surrounding environments and/or navigate. This is because the images captured by the machines in inadequate lighting environments may not clearly depict objects, such as dynamic objects that are moving throughout the environments. When a machine's ability to perceive a surrounding environment is impaired, additional problems may occur. For example, the machine may be unable to navigate within the environment and/or may collide with objects located within the environment if attempting to navigate.

SUMMARY

Embodiments of the present disclosure relate to fusing simulated and real-world data for semi-autonomous and/or autonomous systems and applications. Systems and methods described herein may obtain real images captured using one or more image sensors of a machine navigating within an environment along with simulated images captured using a simulation (e.g., digital twin, in embodiments) of the environment. As described herein, in some examples, the real images may be associated with a first level or characteristic(s) of lighting while the simulated images are associated with a second, greater (or a least different) level or characteristic(s) of lighting. For instance, the simulation of the environment may be generated to include optimal lighting conditions throughout the environment. Systems and methods are then described that generate blended images by at least blending the real images with the simulated images. In some examples, different weights may be used to perform the blending—such as one or more first weights that are applied to the real images and one or more second weights that are applied to the simulated images—where the weights may be static and/or adjusted. As described herein, by performing such processes to generate the blended images, the blended images may be associated with a third level or characteristic(s) of lighting that is also greater (or at least different) from the first level or characteristic(s) of lighting. This way, objects located within the environment—such as static objects and/or dynamic objects—are more clearly depicted within the blended images such that processing performed—e.g., for object detection, path planning, etc.—using the blended images is more accurate.

In contrast to conventional systems, the systems of the present disclosure, in some embodiments, generate blended images using at least the real images captured within the environment by a machine and the simulated images captured using the simulated environment. As such, since the simulated images may represent the environment with optimal lighting conditions, the blended images may depict the environment using a greater level of light as compared to the real images. This way, the machine is better able to perceive the surrounding environment, especially when lighting with the environment is inadequate for one or more reasons. For instance, and as described in more detail herein, machine learning models, neural networks, algorithms, classifiers, and/or other types of processing components that process the blended images may generate more accurate outputs as compared to if the real images were solely processed.

BRIEF DESCRIPTION OF THE DRAWINGS

The present systems and methods for fusing simulated and real-world data for semi-autonomous and/or autonomous systems and applications are described in detail below with reference to the attached drawing figures, wherein:

FIG. 9 illustrates a flow diagram showing a method for blending real and simulated images for machine operation, in accordance with some embodiments of the present disclosure;

FIG. 10 illustrates a flow diagram showing a method for using feedback to update image fusion, in accordance with some embodiments of the present disclosure;

DETAILED DESCRIPTION

Figure 1:
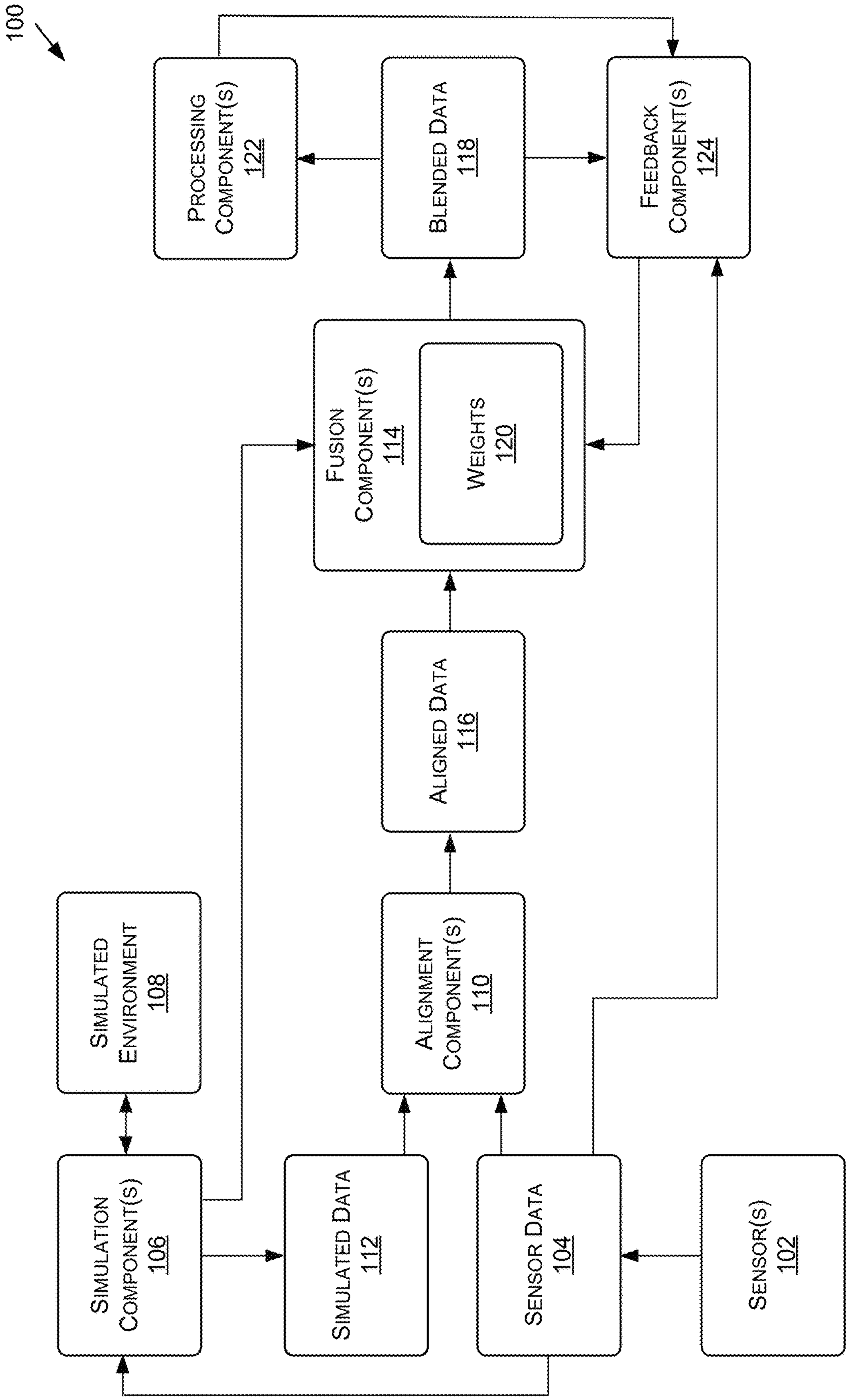
FIG. 1 illustrates an example data flow diagram for a process of fusing real-world and simulated data for machine operation, in accordance with some embodiments of the present disclosure.

Systems and methods are disclosed related to fusing simulated and real-world data for semi-autonomous and/or autonomous systems and applications. Although the present disclosure may be described with respect to an example autonomous or semi-autonomous vehicle or machine 1200 (alternatively referred to herein as "vehicle 1200," "ego-vehicle 1200," "ego-machine 1200," or "machine 1200," an example of which is described with respect to FIGS. 12A-12D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to fusing data and/or processing fused data for machine operations, this is not intended to be limiting, and the systems and methods described herein may be used in augmented reality, virtual reality, mixed reality, robotics, security and surveillance, autonomous or semi-autonomous machine applications, and/or any other technology spaces where fusing data and/or processing fused data for machine operations may be used.

For instance, a system(s) may obtain sensor data using one or more sensors of a machine—such as a semi-autonomous and/or autonomous vehicle and/or other type of robot—navigating within an environment. As described herein, the sensor data may include, but is not limited to, image data obtained using one or more image sensors, LiDAR data obtained using one or more LiDAR sensors, RADAR data obtained using one or more RADAR sensors, light data obtained using one or more light sensors, location data obtained using one or more location sensors, and/or any other type of sensor data obtained using any other type of sensor. Additionally, the environment may include an interior environment—such as a retail environment, a warehouse environment, an office environment, an educational environment, and/or any other interior environment—and/or the environment may include an outdoor environment. In some examples, the environment and/or various areas of the environment may be associated with different lighting conditions or characteristics. For example, the environment may be associated with high lighting conditions in which a level of light of equal to or greater than a first threshold level, normal lighting conditions in which a level of light is between the first threshold level and a second threshold level, low lighting conditions in which a level of light is equal to or less than the second threshold level, and/or any other lighting condition or characteristic.

As described herein, the machine may use at least a portion of the sensor data to perform one or more operations, such as to perceive and/or navigate within the environment. For instance, in some examples, the machine may process at least the image data using one or more machine learning models, one or more neural networks, one or more algorithms, one or more classifiers, one or more modules, and/or any other type of processing component that is configured to perform one or more tasks. As described herein, a task may include, but is not limited to, object detection, object classification, object motion prediction, machine localization, trajectory planning, pick and place, and/or any other type of task. However, in some examples, the accuracy of the processing component(s) may be affected by one or more factors, such as the lighting conditions within the environment and/or represented by the images. For example, the processing component(s) may be less accurate when processing images representing low lighting conditions as compared to processing images representing normal lighting conditions. As such, the system(s) may perform more or more processes to increase the quality of the sensor data, such as increasing the level of light represented by images.

For instance, the system(s) may generate a simulation of the environment (referred to, in some examples, as a "simulated environment") using one or more techniques. For example, the system(s) may generate the simulated environment using digital twin processing, rasterization, raytracing, one or more machine learning models (e.g., a deep neural network, a generative adversarial network, etc.), another rendering technique, and/or any combination thereof. Additionally, in some examples, the system(s) may generate the simulated environment to include optimal lighting conditions (e.g., normal lighting conditions, high lighting conditions, etc.), such as by adding additional lights to the simulated environment. As described in more detail herein, the system(s) may perform one or more processes when adding the lights, such as by identifying areas of the environment that include low lighting conditions. Techniques for generating the simulated environment may be described in U.S. Provisional Patent Application No. 62/644,385, filed Mar. 17, 2018, U.S. Provisional Patent Application No. 62/644,386, filed Mar. 17, 2018, U.S. Provisional Patent Application No. 62/644,601, filed Mar. 19, 2018, and U.S. Provisional Application No. 62/644,806, filed Mar. 19, 2018, U.S. Non-Provisional patent application Ser. No. 16/354,983, filed on Mar. 15, 2019, and/or U.S. Non-Provisional patent application Ser. No. 16/355,214, filed on Mar. 15, 2019, each of which is hereby incorporated by reference in its entirety. For example, the simulated environment may be generated within a collaborative content generation and sharing platform (e.g., NVIDIA's Omniverse), and/or may be generated using light transport simulation algorithms. In some embodiments, the simulated environment may include at least a partial digital twin of the real-world environment. More details on simulation are described herein.

The system(s) may then use the simulated environment to increase the quality of the sensor data obtained from the machine within the environment. For instance, when receiving image data representing a real image of the environment, the system(s) may then obtain a simulated image of the environment using one or more simulated sensors (e.g., at a same or different pose as the real-world sensor) within the simulated environment. In some examples, the system(s) may initially align the machine and/or the sensor that generated the real image within the simulated environment to obtain the simulated image. This way, the real image and the simulated image may both represent a similar area of the environment. The system(s) may then generate a blended image (also referred to, in some examples, as a "fused image" or a "combined image") using the real image and the simulated image. As described in more detail herein, in some examples, the blended image may preserve the clarity from the simulated environment while also maintaining the real-world details from the perspective of the machine. Additionally, the system(s) may generate a blended image using one or more algorithms, one or more machine learning models, one or more neural networks, and/or any other image processing technique associated with combining images.

For an example of generating the blended image, the system(s) may generate the blended image by blending the simulated image with the real image. When blending the images together, the system(s) may use at least a first weight to apply to the real image and/or a second weight to apply to the simulated image. For instance, the first weight may include 60% (and/or any other percentage) and the second weight may include 40% (and/or any other percentage) such that 60% of the blending is from the real image while 40% of the blending is from the simulated image. For example, the system(s) may multiply pixel values of the pixels of the real image by the first weight to determine updated pixel values, multiply pixel values of the pixels of the simulated image by the second weight to determine updated pixel values, and then combine the updated pixels values for the images. While this is just one example technique for generating the blended image using the real image and the simulated image, in other examples, additional and/or alternative techniques may be used to generate the blended image, which are described herein.

The system(s) may then continue to perform these processes of generating blended images as the system(s) continues receiving image data from the machine. As such, in some examples, since the simulated images may represent the environment with optimal lighting conditions, the blended images may represent the environment using a greater level of light as compared to the real images (e.g., preserving the clarity from the simulated environment). This way, objects that are located within a field-of-view (FOV) of an image sensor that generates the image data may be more clearly represented in the blended images as compared to the real images. As such, even if an area of the environment for which the machine is located includes a low lighting condition, the processing component(s) is still able to generate outputs that include high accuracy by processing the blended images in addition to, or alternatively from, the real images.

In some examples, the system(s) may perform one or more processes to update the generating of the blended images, such as to increase the quality of the blended images for processing. For instance, the system(s) may update the first weights that are applied to the real images and/or the second weights that are applied to the simulated images based on one or more factors. For a first example, the system(s) may update the first weight(s) and/or the second weight(s) based on the current lighting conditions within the environment. In such an example, the system(s) may increase the first weight(s) and/or decrease the second weight(s) with the increase of light within the environment while decreasing the first weight(s) and/or increasing the second weight(s) with the decrease of light within the environment. This way, more of the simulated images is used when generating the blended images in low lighting conditions such that the blended images will represent a greater level of light.

For a second example, the system(s) may process the blended images using one or more processing components, such as the processing component(s) of the machine. Based at least on the processing, the system(s) may update the first weight(s) associated with the real images and/or the second weight(s) associated with the simulated images. For instance, if the outputs from the processing component(s) are accurate (e.g., equal to or greater than a threshold accuracy), then the system(s) may maintain the first weight(s) and/or the second weight(s). This is because the blended images include a high enough quality that the processing component(s) is able to accurately perform the task(s) when processing the blended images. However, if the outputs from the processing component(s) are inaccurate (e.g., less than the threshold accuracy), then the system(s) may update the first weight(s) and/or the second weight(s). By updating the weights, the system(s) may increase the quality of later generated blended images such that the accuracy of the processing component(s) also increases.

As described herein, the system(s) may be utilized with regard to various types of technologies. For a first example, the system(s) may be included within and/or utilized by a robot (e.g., an autonomous mobile robot (AMR), a humanoid robot, a robotic arm, end effector, and/or other stationary robot, a forklift, a drone, an autonomous or semi-autonomous watercraft, etc.) that is navigating or operating within an environment. This way, even when one or more areas of the environment include low lighting conditions, the robot is still able to perceive the surrounding environment to perform various tasks, such as localization, object detection, trajectory planning, and/or the like. For a second example, the system(s) may be included within and/or utilized by a semi-autonomous and/or autonomous vehicle that is navigating within an environment. This way, even during low lighting condition, such as night, the semi-autonomous and/or autonomous vehicle may still generate and/or process blended images that more clearly represent the surrounding environment. Similar to the robot, this may allow the semi-autonomous and/or autonomous vehicle to better perceive the surrounding environment when performing various tasks, such as localization, object detection, trajectory planning, and/or the like.

As described herein, an environment, such as a real environment and/or a simulated environment, may be associated with a level of light. In some examples, a level of light may be measured using various types of measurements, such as lumens, lux, candelas, photometry, and/or any other type of measurement. Additionally, an environment may be associated with different lighting conditions, such as high lighting conditions in which a level of light of equal to or greater than a first threshold level, normal lighting conditions in which a level of light is between the first threshold level and a second threshold level, low lighting conditions in which a level of light is equal to or less than the second threshold level, and/or any other lighting condition.

In some examples, the processing component(s) (e.g., machine learning models, deep neural networks, language models, LLMs, VLMs, multi-modal language models, perception models, tracking models, fusion models, transformer models, diffusion models, encoder-only models, decoder-only models, encoder-decoder models, neural rendering field (NERF) models, etc.) described herein may be packaged as a microservice—such an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model(s) (e.g., weights and biases). In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model(s) may be accessible via one or more APIs-such as REST APIs. As such, and in some embodiments, the machine learning model(s) described herein may be deployed as an inference microservice to accelerate deployment of a model(s) on any cloud, data center, or edge computing system, while ensuring the data is secure. For example, the inference microservice may include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring).

The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high performance inference), an inference runtime software to execute the machine learning model(s) and provide outputs/responses to inputs, and enterprise management software to provide health checks, identity, and/or other monitoring. In some embodiments, the inference microservice may include software to perform in-place replacement and/or updating to the machine learning model(s). When replacing or updating, the software that performs the replacement/updating may maintain user configurations of the inference runtime software and enterprise management software.

Additionally, in some embodiments, the systems and methods described herein may be performed within a simulation environment (e.g., NVIDIA's DriveSIM, ISAAC GYM, and/or ISAAC SIM) using simulated data (e.g., simulated sensor data of simulated sensors of a virtual or simulated machine). For example, simulated sensor data and/or map data (simulated or real) may be used to perform various operations within the simulation environment, such as to generate the simulation data and/or operate a machine. These simulated operations may be used to test performance of the underlying algorithms, systems, and/or processes prior to deploying them in the real-world. In some instances, the simulation may be used to generate synthetic training data—e.g., training data including landmarks, features, objects, etc.—so that the synthetic training data (in addition to or alternatively from real-world data) may then be processed to perform one or more of the operations described herein.

In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing one or more vision language models (VLMs), systems implementing one or more multi-modal language models, systems using or deploying one or more inference microservices, systems that incorporate deploy one or more machine learning models in a service or microservice along with an OS-level virtualization package (e.g., a container), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of fusing real-world and simulated data for machine operation, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1200 of FIGS. 12A-12D, example computing device 1300 of FIG. 13, and/or example data center 1400 of FIG. 14.

The process 100 may include one or more sensors 102 generating sensor data 104. As described herein, the sensor data 104 may include, but is not limited to, image data obtained using one or more image sensors, LiDAR data obtained using one or more LiDAR sensors, RADAR data obtained using one or more RADAR sensors, light data obtained using one or more light sensors, location data obtained using one or more location sensors, and/or any other type of sensor data obtained using any other type of sensor. In some examples, the sensor(s) 102 may be included as part of and/or associated with a machine. For example, the sensor(s) 102 may be included as part of a semi-autonomous and/or autonomous vehicle (e.g., an example autonomous vehicle 1202) and/or robot that is navigating within an environment. Additionally, or alternatively, in some examples, the sensor(s) 102 may be located at various locations within the environment.

Figure 2:
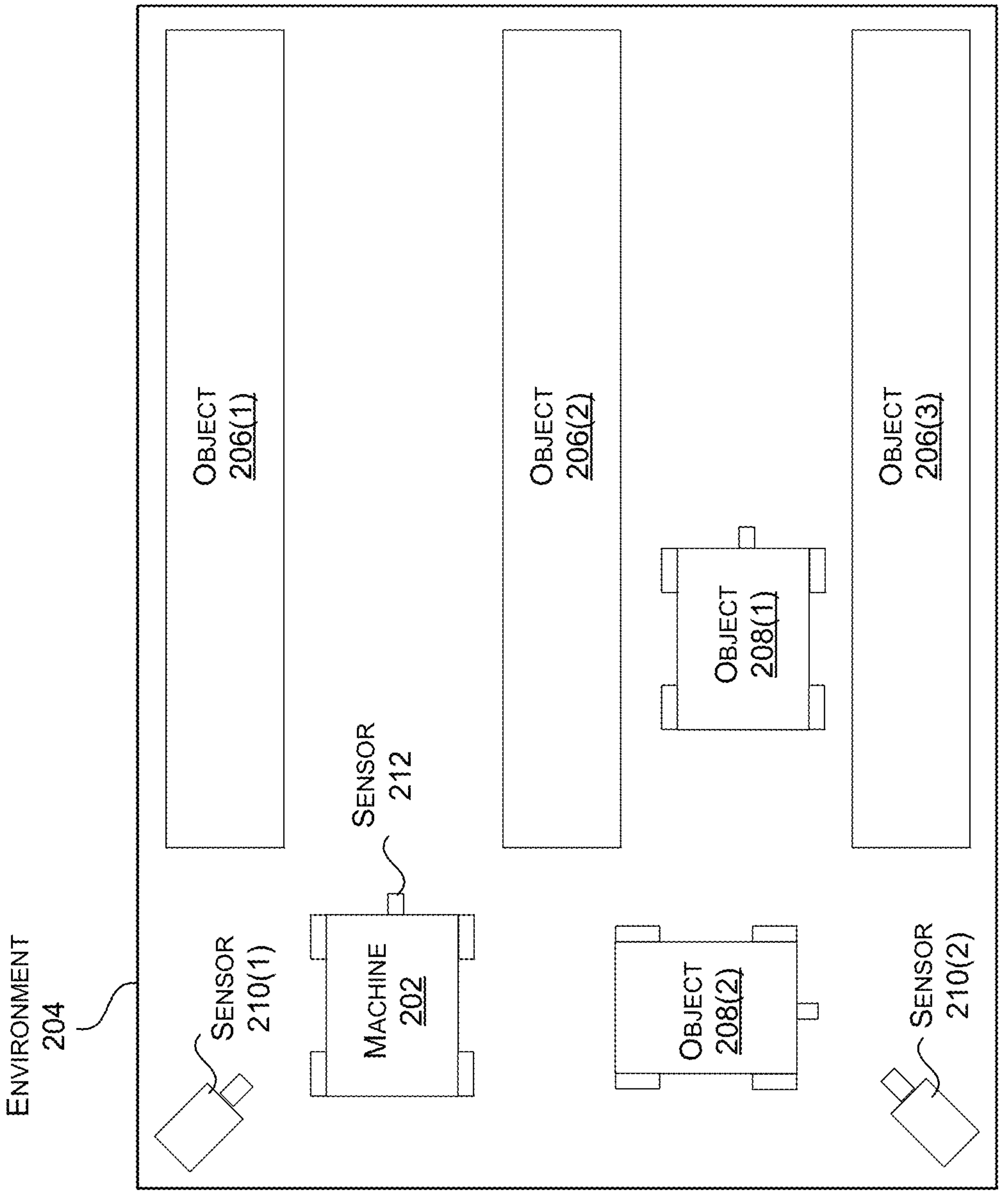
FIG. 2 illustrates an example of a machine navigating within an environment, in accordance with some embodiments of the present disclosure.

For instance, FIG. 2 illustrates an example of a machine 202 navigating within an environment 204, in accordance with some embodiments of the present disclosure. As shown, the environment 204 may include both static objects 206(1)-(3) (also referred to singularly as "static object 206" or in plural as "static objects 206") and dynamic objects 208(1)-(2) (also referred to singularly as "dynamic object 208" or in plural as "dynamic objects 208"). While the example of FIG. 2 illustrates the static objects 206 as include shelves for storing items, in other examples, static objects may include any other type of object, such as furniture, appliances, walls, traffic features, certain electronics, and/or any other type of stationary object. Additionally, while the example of FIG. 2 illustrates the dynamic objects 208 as including other machines, in other examples, dynamic objects may include any other type of object, such as people, animals, robots, and/or any other type of moving object.

The environment 204 further includes sensors 210(1)-(2) (also referred to singularly as "sensor 210" or in plural as "sensors 210")—such as image sensors (and/or any other type of sensor)—that generate sensor data representing an interior of the environment 204. Additionally, the machine 202 may include at least a sensor 212—such as an image sensor (and/or any other type of sensor)—that the machine 202 uses to navigate around the environment 204. For instance, the machine 202 (and/or a separate computing device, such as a remote system) may obtain sensor data generated using the sensor 212. The machine 202 may then process the sensor data using one or more processing components—such as one or more machine learning models, one or more neural networks, one or more algorithms, one or more classifiers, one or more modules, and/or any other type of processing component—that are configured to perform one or more tasks. For instance, the processing component(s) may be configured to perform object detection, object classification, object motion prediction, machine localization, trajectory planning, and/or any other type of task.

Referring back to the example of FIG. 1, the process 100 may include one or more simulation components 106 generating a simulated environment 108 that represents the actual environment for which the machine is navigating. As described herein, the simulation component(s) 106 may generate the simulated environment 108 using one or more techniques. For instance, the simulation component(s) 106 may generate the simulated environment 108 using digital twin processing, rasterization, raytracing, one or more machine learning models (e.g., a deep neural network, a generative adversarial network, etc.), another rendering technique, and/or any combination thereof. Additionally, in some examples, the simulation component(s) 106 may generate the simulated environment 108 to include optimal lighting conditions, such as by adding additional lights to the simulated environment 108. As described herein, the simulated environment 108 may include optimal lighting conditions based at least on the simulated environment including normal lighting conditions, high lighting conditions, and/or the like.

In some examples, the simulation environment 108 and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

Figure 3:
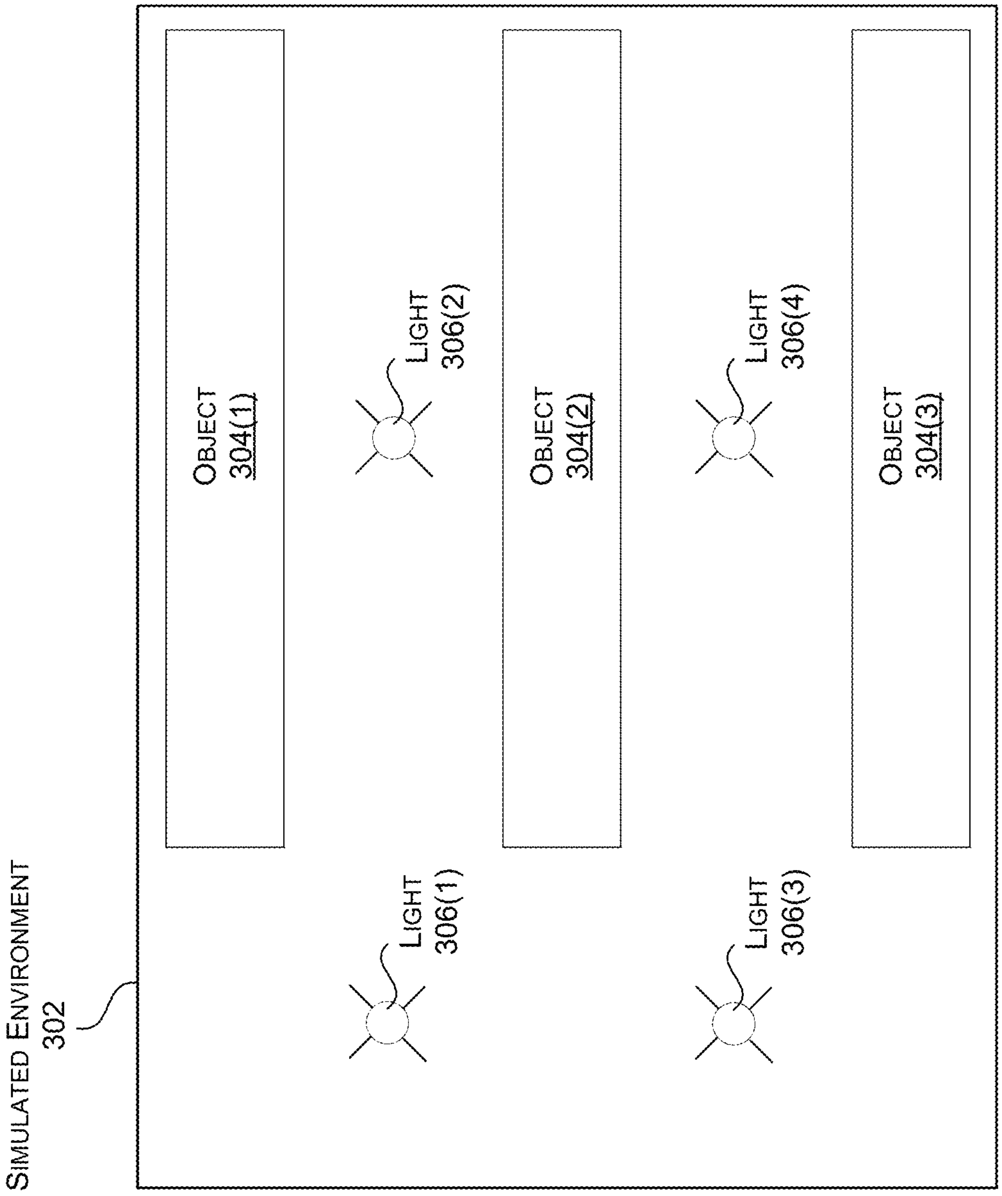
FIG. 3 illustrates an example of a simulated environment, in accordance with some embodiments of the present disclosure.

For instance, FIG. 3 illustrates an example of a simulated environment 302, in accordance with some embodiments of the present disclosure. As shown, the simulation component(s) 106 may generate the simulated environment 302 that corresponds to the environment 204. For instance, the simulated environment 302 may include similar dimensions as the environment 204 and/or include at least virtual objects 304(1)-(3) (also referred to singularly as "virtual object 304" or in plural as "virtual objects 304") that respectively represent to the static objects 206 located within the environment 204. However, in other examples, the simulated environment 302 may also include virtual representations of the machine 202 and/or the dynamic objects 208.

Additionally, the simulation component(s) 106 may generate the simulated environment 302 to include lights 306 (1)-(4) (also referred to singularly as "light 306" or in plural as "lights 306") in order to increase the level of light associated with the simulated environment 302. For instance, the lights 306 may be added to the simulated environment 302 in order to cause the simulated environment 302 to include optical lighting conditions. In some examples, the simulation component(s) 106 may use one or more techniques to determine a number of the lights 306 and/or locations for the lights 306 within the simulated environment 302. For example, the simulation component(s) 106 may add the lights 306 to locations within the simulated environment 302 that correspond to areas of the environment 204 that include low lighting conditions. As such, by adding the lights 306 to the simulated environment 302, the simulated environment 302 may include a greater level of light as compared to the environment 204.

As described herein, the simulation component(s) 106 may perform any technique to generate the simulated environment 302. For example, the simulation component(s) 106 may generate the simulated environment 302 using sensor data obtained from the sensors 210 of the environment 204, the sensor 212 of the machine 202, sensors of the dynamic objects 208, and/or any other sensors located within the environment 204, In some examples, the simulation component(s) 106 may further update the simulated environment 302, such as at the elapse of time intervals (e.g., each day, week, month, etc.), in response to an event (e.g., the environment 204 being updated, a request being received, etc.), and/or continuously as additional sensor data is received. As described herein, in some examples, the simulated environment 302 may include a digital twin simulation of the environment 204. However, in other examples, the simulated environment 302 may be generated using any other rendering technique for generating simulations.

Referring back to the example of FIG. 1, the process 100 may include one or more alignment components 110 that are configured to receive at least a portion of the sensor data 104 along with simulation data 112 associated with the simulated environment 108. The alignment component(s) 110 may then be configured to align the simulation data 112 with respect to the sensor data 104. For example, if the sensor data 104 represents one or more real images of the environment, then the alignment component(s) 110 may align one or more simulated images represented by the simulation data 112 with the real image(s). As described herein, the alignment component(s) 110 may use any technique to align the simulation data 112 with respect to the sensor data 104.

For example, the alignment component(s) 110 may use at least a portion of the sensor data 104 to localize the machine within the environment. In some examples, the alignment component(s) 110 may use location data—such as Global Positioning System Data (and/or any other type of location data)—to perform the localization. Additionally, or alternatively, in some examples, the alignment component(s) 110 may use other types of data—such as image data, LiDAR data, and/or RADAR data—to perform the localization and/or refine the localization. In any of the examples, the alignment component(s) 110 may then use the localization of the machine to perform the alignment. For instance, and for a real image, the alignment component(s) 110 may use the localization to obtain and/or generate a simulated image using a virtual image sensor that includes a same pose (e.g., location, orientation, etc.) as the machine and/or as the sensor 102 that captured the real image.

Figure 4:
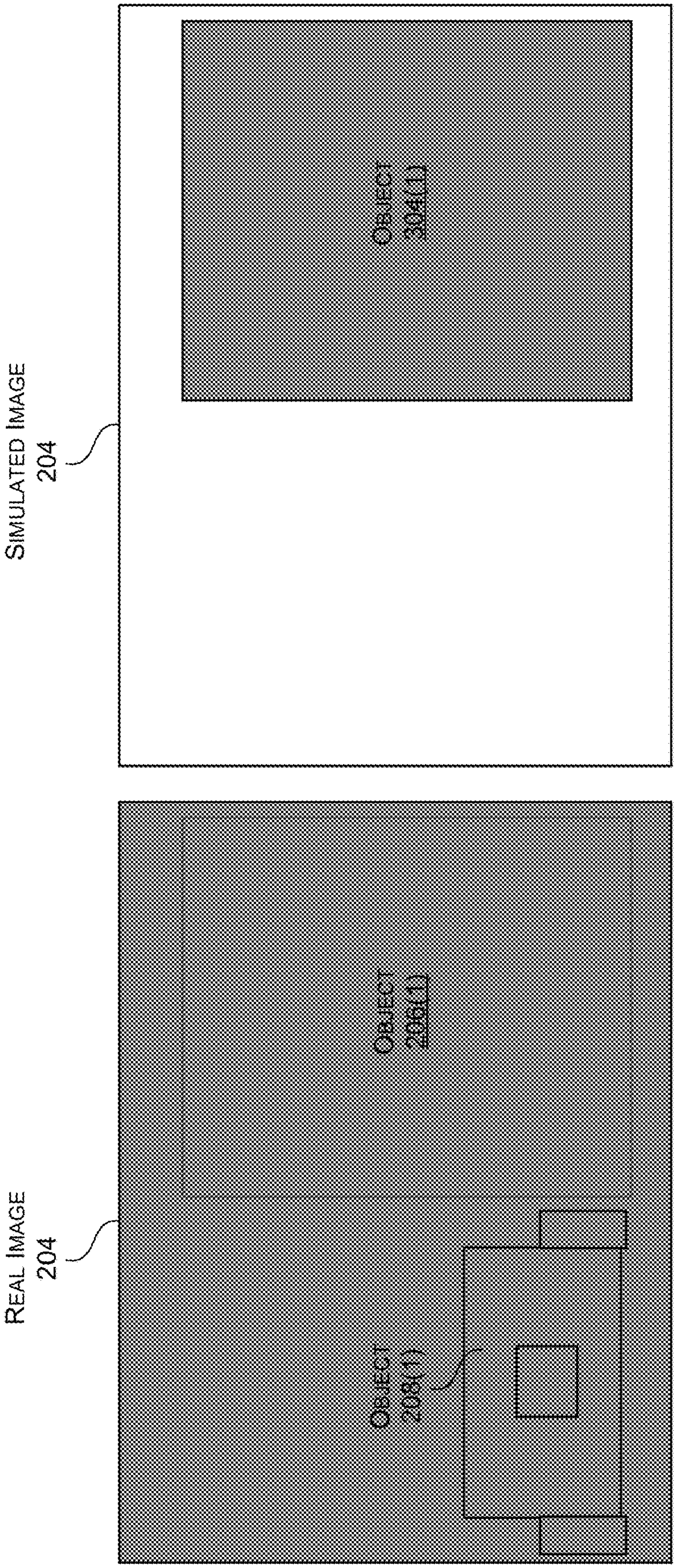
FIG. 4 illustrates an example of aligning a real image with a simulated image, in accordance with some embodiments of the present disclosure.

For instance, FIG. 4 illustrates an example of aligning a real image 402 with a simulated image 404, in accordance with some embodiments of the present disclosure. As shown, the real image 402, which may be captured using the sensor 212 of the machine 202, may represent at least the static object 206(1) and the dynamic object 208(1) located within the environment 204. However, based on a low lighting condition within the environment 204, at least the static object 206(1) may barely be visible as represented by the real image 402. Additionally, the simulated image 404 may represent the virtual object 304(1) without representing the dynamic object 208(1). As shown, based on the optimal lighting condition associated with the simulated environment 302, the virtual object 304(1) that corresponds to the static object 206(1) is visible as represented by the simulated image 404.

Furthermore, in the example of FIG. 4, the alignment component(s) 110 may have performed one or more of the processes described herein to align the simulated image 404 with respect to the real image 402. For instance, the real image 402 may represent an area of the environment 204 while the simulated image 404 represents an area of the simulated environment 302 that corresponds to the same area of the environment 204. As described herein, the alignment component(s) 110 may use any technique to align the simulated image 404 with respect to the real image 402. For instance, the alignment component(s) 110 may initially determine a pose of the machine 202 (and/or the sensor 212) within the environment 204 and then use the pose to perform the alignment.

Referring back to the example of FIG. 1, the process 100 may include one or more fusion components 114 receiving alignment data 116 from the alignment component(s) 110. As described herein, the alignment data 116 may represent the simulation data 112 aligned with the sensor data 104. For instance, in some examples, the alignment data 116 may represent the simulated images aligned with the real images. The process 100 may then include the fusion component(s) 114 generating blended images using at least the real images and the simulated images. As described herein, in some examples, the blended images may preserve the clarity from the simulated environment 108 while also maintaining the real-world details from the perspective of the machine. Additionally, the fusion component(s) 108 may generate the blended images using one or more algorithms, one or more machine learning models, one or more neural networks, and/or any other image processing technique associated with combining images.

For instance, in some examples, to blend a simulated image with a real image, the fusion component(s) 114 may use at least a first weight 120 to apply to the real image and/or a second weight 120 to apply to the simulated image. For instance, the first weight 120 may include 60% (and/or any other percentage) and the second weight 120 may include 40% (and/or any other percentage) such that 60% of the blending is from the real image while 40% of the blending is from the simulated image. For example, to perform the blending using the weights 120, the fusion component(s) 114 may multiply pixel values of the pixels of the real image by the first weight 120 to determine updated pixel values, multiply the pixel values of the pixels of the simulated image by the second weight 120 to determine updated pixel values, and then combine updated pixels values for the images.

Figure 5:
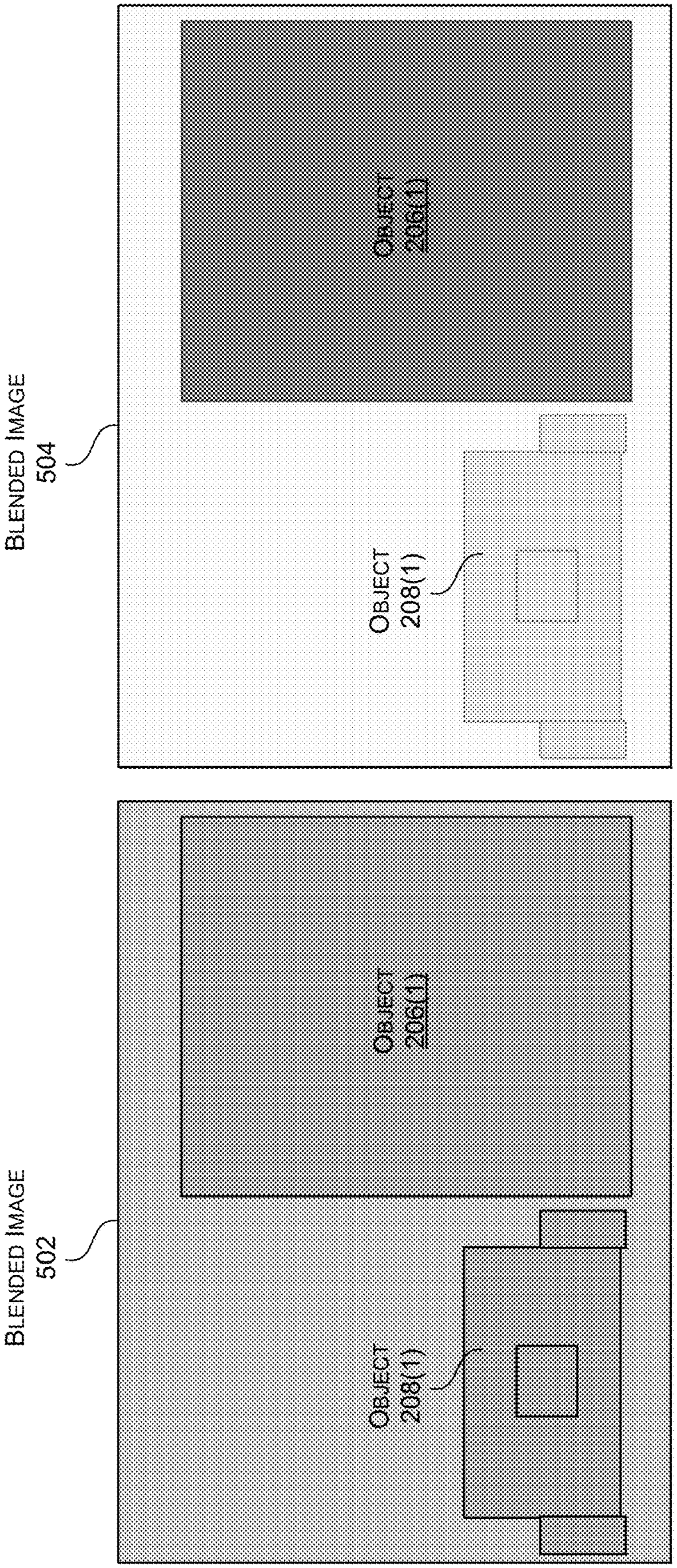
FIG. 5 illustrates examples of blending a simulated image with a real image using different weights, in accordance with some embodiments of the present disclosure.

For instance, FIG. 5 illustrates examples of blending the simulated image 404 with the real image 402 using different weights, in accordance with some embodiments of the present disclosure. As shown, to generate a blended image 502, the fusion component(s) 114 may use a first weight associated with the real image 402 and a second weight associated with the simulated image 404, where the first weight is greater than the second weight. For example, the first weight may include 60% while the second weight may include 40%. As such, the level of light as represented by the blended image 502 is greater than the level of light as represented by the real image 402. Additionally, and for similar reasons, the static object 206(1) is more visible in the blended image 502 as compared to the real image 402.

Alternatively, to generate a blended image 504, the fusion component(s) 114 may again use a first weight associated with the real image 402 and a second weight associated with the simulated image 404. However, in this example, the second weight may be greater than the first weight. For example, the first weight may include 40% while the second weight may include 60%. As such, the level of light as represented by the blended image 504 is again greater than the level of light as represented by the real image 402. Additionally, since the second weight used to generate the blended image 504 is greater than the second weight used to generate the blended image 502, the level of light as represented by the blended image 504 is also greater than the level of light as represented by the blended image 502.

Furthermore, based on the weights used to generate the blended images 502 and 504, the static object 206(1) may be more visible in the blended image 504 as compared to the real image 402 and the blended image 502. However, the dynamic object 208(1) as represented by the blended image 504 may be less visible as compared to the dynamic object 208(1) as represented by the blended image 502 since the first weight used to generate the blended image 504 is less than the first weight used to generate the blended image 502. As such, and as described in more detail herein, determining optimal weights for performing the blending of simulated images with real images is important for generating the highest quality blended images.

Referring back to the example of FIG. 1, the fusion component(s) 114 may perform one or more additional and/or alternative techniques when blending the simulated images with the real images. For instance, the fusion component(s) 114 may identify specific objects represented by the real images, such as dynamic objects that are located within the environment, objects that are not represented by the corresponding simulated images, and/or any other type of object. The fusion component(s) 114 may then perform different processing with respect to the portions of the real images that represent these specific objects as compared to other portions of the real images when performing the blending of the simulated images with the real images. For example, the fusion component(s) 114 may increase the first weight 120 that is applied to at least these portions of the real images when performing the blending such that the specific objects are more visible in the blended images.

Figure 6:
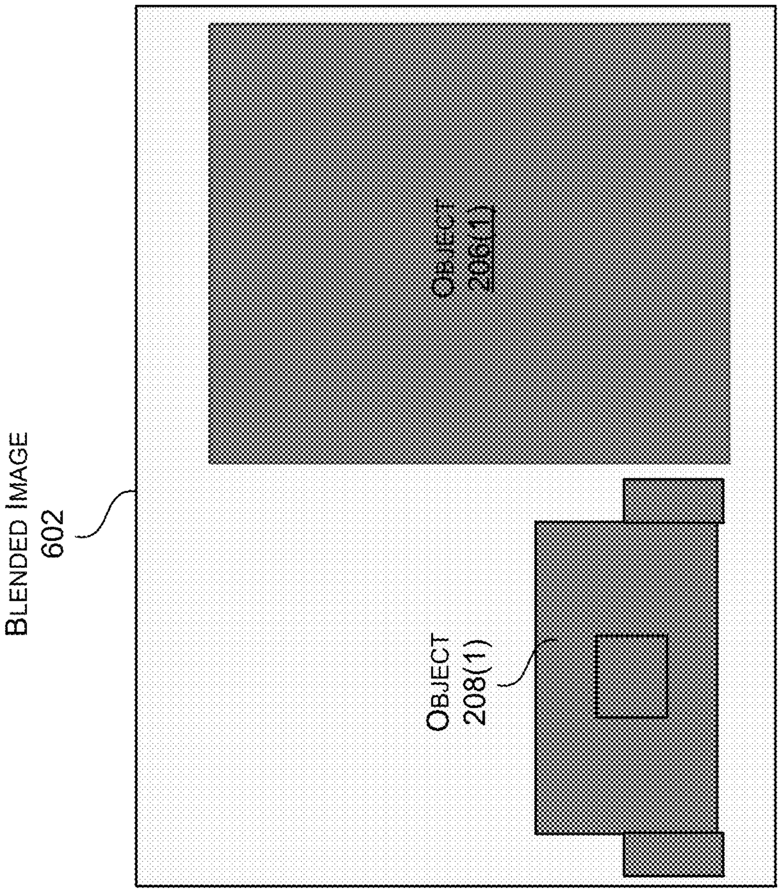
FIG. 6 illustrates examples of using object locations to blend a simulated image with a real image, in accordance with some embodiments of the present disclosure.

For instance, FIG. 6 illustrates examples of using object locations to blend the simulated image 404 with the real image 402, in accordance with some embodiments of the present disclosure. In the example of FIG. 6, the fusion component(s) 114 may initially identify the dynamic object 208(1) represented by the real image 402. As described herein, the fusion component(s) 114 may use any technique to identify the dynamic object 208(1), such as by processing the real image 402 using one or more processing components that are trained to classify objects, determining that the simulated image 404 does not also represent the dynamic object 208(1), and/or any other technique. As such, the fusion component(s) 114 may again generate a blended image 602 by blending the simulated image 404 with the real image 402 using a first weight associated with the real image 402 and a second weight associated with the simulated image 404.

However, in the example of FIG. 6, the fusion component(s) 114 may use a third weight for the portion of the real image 402 that represents the dynamic object 208(1) and a fourth weight for the portion of the simulated image 404 that corresponds to the portion of the real image 402 that represents the dynamic object 208(1). In some examples, the third weight may be greater than the first weight and the fourth weight may be less than the second weight. In other words, to perform the blending, the fusion component(s) 114 may apply a greater weight to the portion of the real image 402 that represents the dynamic object 208(1) as compared to the rest of the real image 402 such that the dynamic objects 208(1) is more visible in the blended image 602 while also ensuring that the blended image 602 includes a greater level of light as compared to the real image 402.

Referring back to the example of FIG. 1, when blending the images, the fusion component(s) 114 may again identify specific objects represented by the real images, such as objects that are not represented by the simulated images (e.g., dynamic objects). The fusion component(s) 114 (and/or the simulation component(s) 106) may then update the simulated images to further simulate the identified objects. For example, if a real image represents a robot that is not represented by a corresponding simulated image, then the fusion component(s) 114 (and/or the simulation component(s) 106) may update the simulated image to represent a virtual robot at a portion of the simulated image that corresponds to a portion of the real image that represents the robot. After updating the simulated images, the fusion component(s) 114 may then perform one or more of the techniques described herein to again generate the blended images using the real images and the simulated images.

Figure 7:
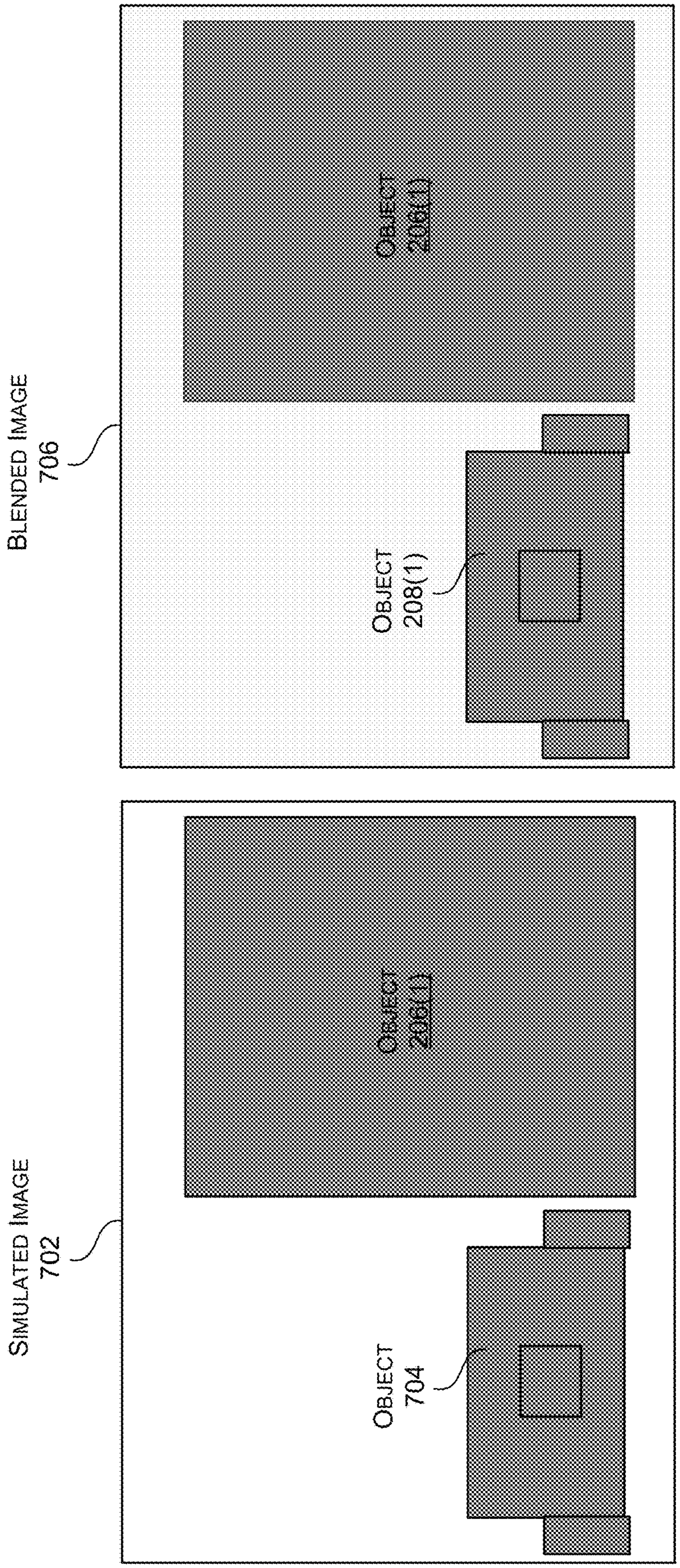
FIG. 7 illustrates an example of updating a simulated image to include a virtual object and then using the updated simulated image for blending, in accordance with some embodiments of the present disclosure.

For instance, FIG. 7 illustrates an example of updating the simulated image 404 to include a virtual object and then using the updated simulated image for blending, in accordance with some embodiments of the present disclosure. As shown, the fusion component(s) 114 (and/or the simulation component(s) 106) may generate a simulated image 702 using the real image 402 and the simulated image 404. For instance, the fusion component(s) 114 may determine that the real image 402 represents the dynamic object 208(1) and that the simulated image 404 does not represent the dynamic object 208(1). As such, the fusion component(s) 114 may generate the simulated image 702 by at least adding a virtual object 704 that corresponds to the dynamic object 208(1) to the simulated image 404.

As described herein, the fusion component(s) 114 (and/or the simulation component(s) 106) may use any technique to add the virtual object 704. For a first example, the fusion component(s) 114 may determine a portion of the real image 402 that represents the dynamic object 208(1), determine a portion of the simulated image 404 that corresponds to the portion of the real image 402, determine a classification (e.g., robot) of the dynamic object 208(1), generate the virtual object 704 based at least on the classification, and then add the virtual object 704 to the portion of the simulated image 404. In such an example, the portion of the real image 402 and/or the portion of the simulated image 404 may correspond to pixels of the real image 402 that represent the dynamic object 208(1), may include a bounding shape (e.g., a bounding box, etc.) that at least partially encloses the dynamic object 208(1), and/or may include any other portion of the real image 402 and/or the simulated image 404.

For a second example, the fusion component(s) 114 may generate the virtual object 704 that corresponds to the dynamic object 208(1) and then add the virtual object 704 to the simulated environment 302. In some examples, to add the virtual object 704, the fusion component(s) 114 may determine a pose (e.g., a location, an orientation, etc.) associated with the dynamic object 208(1) within the environment 204 and then use the pose to add the virtual object 704 to the simulated environment 302. For instance, the virtual object 704 may include a similar pose within the simulated environment 302 as the dynamic object 208(1) has in the environment 204. The fusion component(s) 114 may then capture the simulated image 702 within the simulated environment 302 with the virtual object 704 located within the simulated environment 302. While these are just two example techniques for how the fusion component(s) 114 (and/or the simulation component(s) 106) may generate the simulated image 702 that includes the virtual object 704, in other examples, the fusion component(s) 114 (and/or the simulation component(s) 106) may use additional and/or alternative techniques.

As further illustrated by FIG. 7, the fusion component(s) 114 may then perform one or more of the processes described herein to generate a blended image 706 using the real image 402 and the simulated image 702. For example, the fusion component(s) 114 may generate the blended image 706 by blending the simulated image 702 with the real image 402 using a first weight associated with the real image 402 and a second weight associated with the simulated image 702. As such, by performing the processes described with respect to FIG. 7, the blended image 706 may represent a greater level of light as compared to the real image 402. Additionally, the dynamic object 208(1) as depicted by the blended image 706 may be more visible as compared to the dynamic object 208(1) as depicted by at least the blended image 502 and/or the blended image 504.

Referring back to the example of FIG. 1, while the examples herein describe generating the blended images by blending the real images with the simulated images using the weights 120, in other examples, the fusion component(s) 114 may perform one or more additional and/or alternative techniques to generate the blended images. For example, the fusion component(s) 114 may include and/or use one or more machine learning models that process input data representing the real images and the blended images. The machine learning model(s) may then be trained to process the input data in order to generate the blended images.

The process 100 may include one or more processing components 122 processing at least a portion of the blended data 118 in order to perform one or more tasks. As described herein, the processing component(s) 122 may include, but is not limited to, one or more systems, one or more machine learning models, one or more neural networks, one or more algorithms, one or more classifiers, one or more modules, and/or any other type of processing component. For example, the processing component(s) 122 may include a perception system, a localization system, a planning system, and/or any other type of system of the machine. As such, a task may include object detection, object classification, object motion prediction, machine localization, trajectory planning, and/or any other type of task.

The process 100 may also include one or more feedback components 124 using at least a portion of the sensor data 104, at least a portion of the blended data 118, and/or at least a portion of the outputs from the processing component(s) 122 (as indicated by the arrow between the processing component(s) 122 and the feedback component(s) 124) to update the processing performed by at least the fusion component(s) 114. For instance, the feedback component(s) 124 may at least update the weights 120 that the fusion component(s) 114 uses to perform the blending based at least on the sensor data 104, the blended data 118, and/or the outputs.

For instance, the feedback component(s) 124 may use the sensor data 104 to determine a level of light associated with the environment (and/or a portion of the environment for which the machine is navigating). In some examples, the sensor data 104 may be generated using a light sensor and indicate the level of light. In some examples, the sensor data 104 may include the image data representing the real images and the feedback component(s) 124 may then process the real images to determine the level of light. In any of the examples, the feedback component(s) 124 may then update the weights 120 that the fusion component(s) 114 uses for the blending based at least on the level of light. For example, the feedback component(s) 124 may increase the first weights 120 applied to the real images and decrease the second weights 120 applied to the simulated images as the level of light increases or decrease the first weights 120 applied to the real images and increase the second weights 120 applied to the simulated images as the level of light decreases. In other words, the feedback component(s) 124 may cause the blending to use more of the real images when there is an adequate amount of light in the environment and more of the simulated images when there is not an adequate amount of light in the environment.

Additionally, or alternatively, in some examples, the feedback component(s) 124 may determine an accuracy associated with the outputs from the processing component(s) 122 and use the accuracy to update the weights 120 that the fusion component(s) 114 uses for blending. For a first example, the feedback component(s) 124 may cause the fusion component(s) 114 to maintain the weights 120 when the accuracy satisfies (e.g., is equal to or greater than) a threshold accuracy (e.g., 99%) or cause the fusion component(s) 114 to update the weights 120 when the accuracy does not satisfy (e.g., is less than) the threshold accuracy. For a second example, the feedback component(s) 124 may cause the fusion component(s) 114 to maintain the weights 120 when the accuracy associated with specific types of processing—such as object recognition—satisfies (e.g., is equal to or greater than) a threshold accuracy (e.g., 99%) or cause the fusion component(s) 114 to update the weights 120 when the accuracy associated with the specific types of processing does not satisfy (e.g., is less than) the threshold accuracy.

In any of these examples, the feedback component(s) 124 may determine to maintain the weights 120 when the accuracy satisfies the threshold accuracy since the blended images include a high enough quality that the processing component(s) 122 is able to accurately perform one or more tasks (e.g., perceive the environment). Additionally, the feedback component(s) 124 may determine to update the weights 120 when the accuracy does not satisfy the threshold accuracy in order to try and increase the quality of the blended images being processed by the processing component(s) 122. As described herein, by increasing the quality of the blended images, such that the blended images better represent objects located within the environment, the accuracy of the processing component(s) 122 may also increase. Additionally, updating the weights 120 may include increasing the first weights 120 applied to the real images while decreasing the second weights 120 applied to the simulated images and/or decreasing the first weights 120 applied to the real images while increasing the second weights applied to the simulated images.

In some examples, the process 100 may then continue to repeat as the machine is navigating within the environment. For example, the alignment component(s) 110 may continue to align the simulated data 112 with the sensor data 104, the fusion component(s) 114 may continue to generate the blended data 118 using the alignment data 116, the processing component(s) 122 may continue to process the blended data 118, and/or the feedback component(s) 124 may continue to update the processing that is performed by the fusion component(s) 114.

Figure 8:
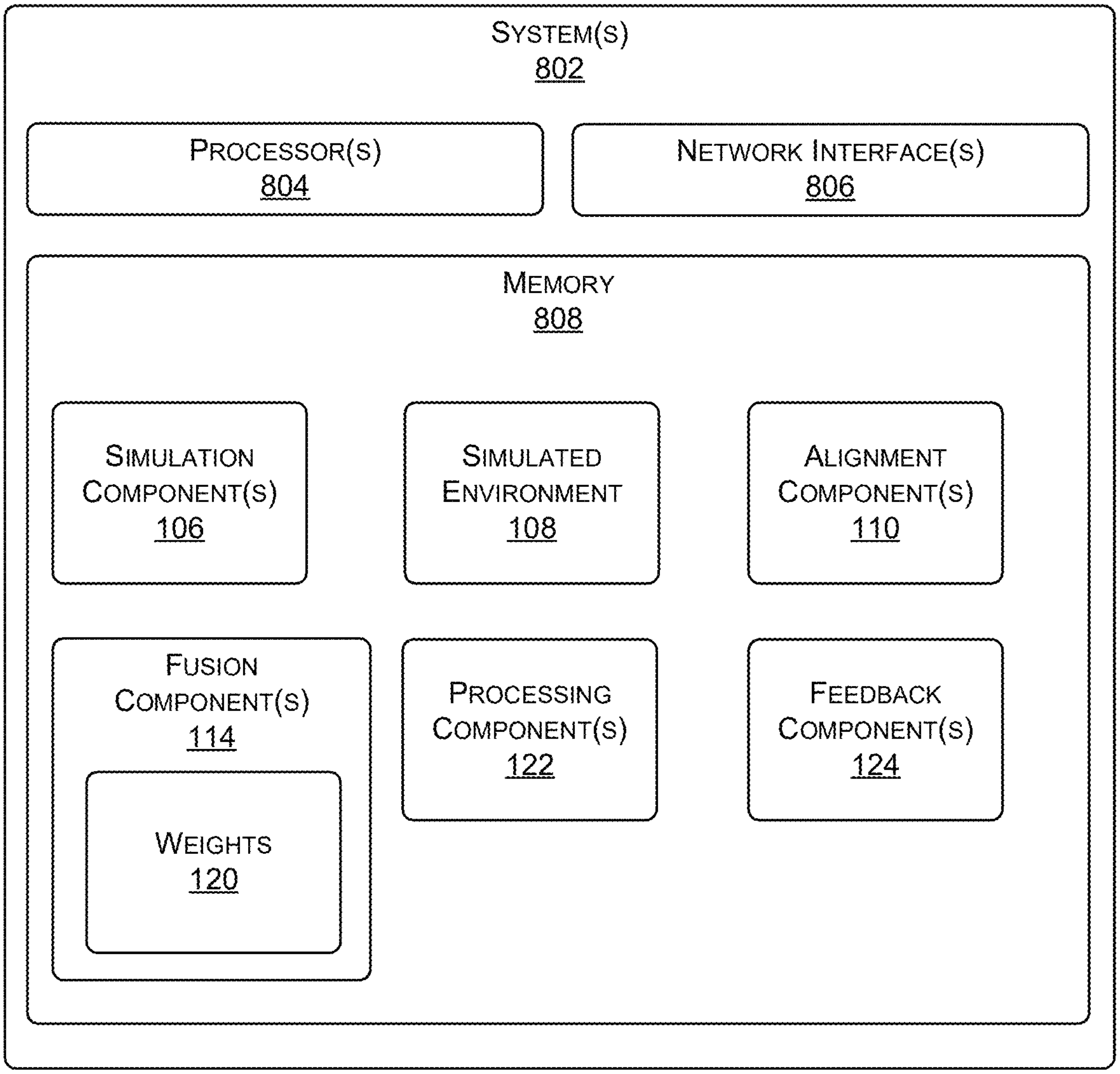
FIG. 8 illustrates an example of one or more systems that may perform at least a portion of the processes described herein, in accordance with some embodiments of the present disclosure.

FIG. 8 illustrates an example of one or more systems 802 that may perform at least a portion of the processes described herein, in accordance with some embodiments of the present disclosure. In some examples, the system(s) 802 may be included as part of a machine, such as an example autonomous vehicle 1200 and/or the machine 202. In some examples, the system(s) 802 may be remote from a machine and/or communicate with the machine via one or more wireless networks. Still, in some examples, at least a portion of the system(s) 802 may be part of a machine while another portion of the system(s) 802 is separate from and/or communicates with the machine via one or more wireless networks.

As shown, the system(s) 802 may include one or more processors 804 (which may include, and/or be similar to, a CPU(s) 1206, a GPU(s) 1208, a CPU(s) 1218, a GPU(s) 1220, a CPU(s) 1306, and/or a GPU(s) 1308), one or more network interfaces 806 (which may include, and/or be similar to, a network interface(s) 1224 and/or a communication interface 1310), and memory 808 (which may include, and/or be similar to, memory 1304). Additionally, the memory 808 may store the simulation component(s) 106, the simulated environment 108, the alignment component(s) 110, the fusion component(s) 114, the processing component(s) 122, and/or the feedback component(s) 124. Furthermore, the processor(s) 804 may execute the simulation component(s) 106, the alignment component(s) 110, the fusion component(s) 114, the processing component(s) 122, and/or the feedback component(s) 124 to perform one or more of the processes described herein.

While the example of FIG. 8 illustrates the simulation component(s) 106, the alignment component(s) 110, the fusion component(s) 114, the processing component(s) 122, and/or the feedback component(s) 124 as including software components, in other examples, the simulation component(s) 106, the alignment component(s) 110, the fusion component(s) 114, the processing component(s) 122, and/or the feedback component(s) 124 may include hardware components, machine learning models, neural networks, modules, algorithms, devices, systems, and/or any other type of processing component. Additionally, in some examples, one or more of the simulation component(s) 106, the alignment component(s) 110, the fusion component(s) 114, the processing component(s) 122, and/or the feedback component(s) 124 may be combined.

Figure 11:
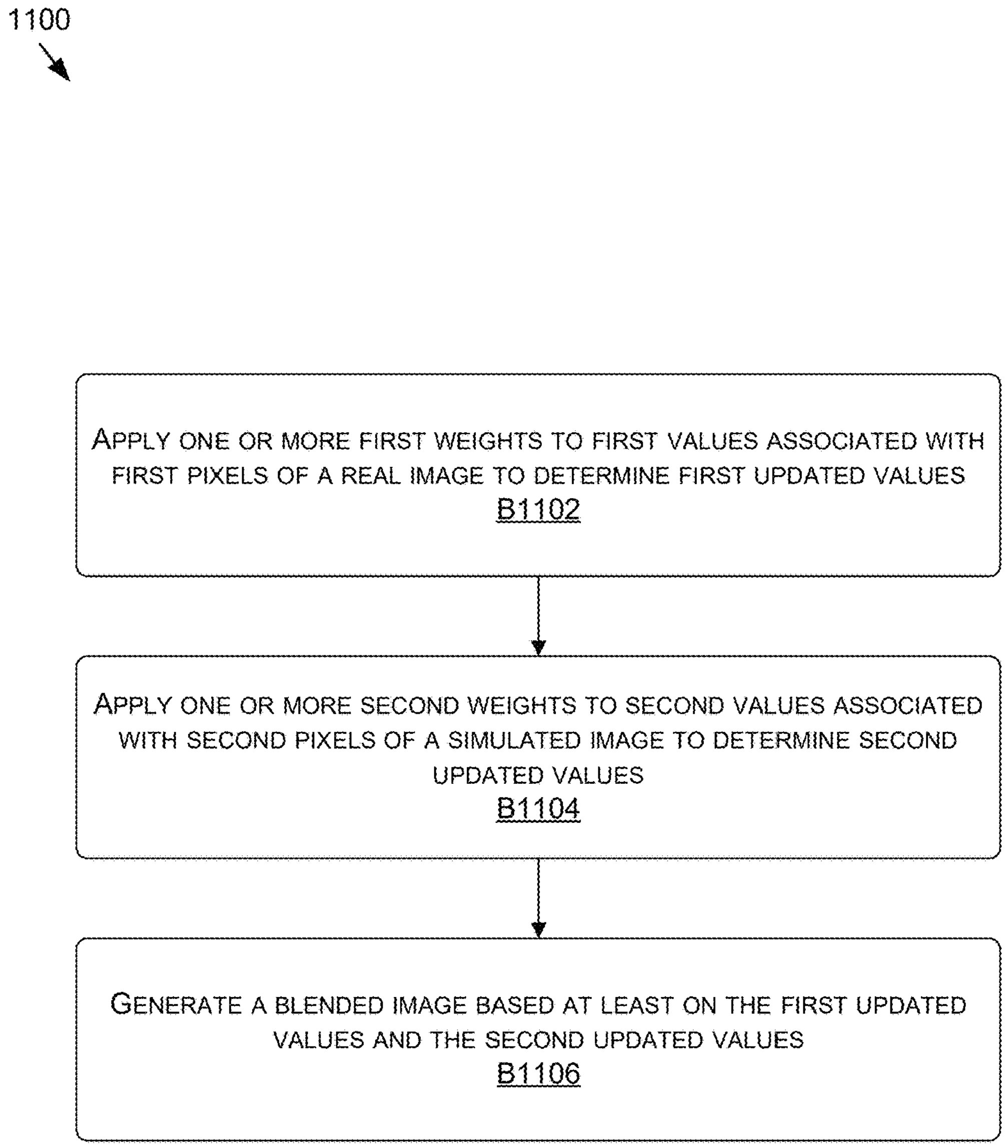
FIG. 11 illustrates a flow diagram showing a method for blending a real image with a simulated image to generate a blended image, in accordance with some embodiments of the present disclosure.

Now referring to FIGS. 9-11, each block of method 900, 1000, and 1100, described herein, comprises a computing process that may be performed using any combination of hardware, firmware, and/or software. For instance, various functions may be carried out by a processor executing instructions stored in memory. The methods 900, 1000, and 1100 may also be embodied as computer-usable instructions stored on computer storage media. The methods 900, 1000, and 1100 may be provided by a standalone application, a service or hosted service (standalone or in combination with another hosted service), or a plug-in to another product, to name a few. In addition, these methods 900, 1000, and 1100 described, by way of example, with respect to FIG. 1. However, these methods 900, 1000, and 1100 may additionally or alternatively be executed by any one system, or any combination of systems, including, but not limited to, those described herein.

FIG. 9 illustrates a flow diagram showing a method 900 for blending real and simulated images for machine operation, in accordance with some embodiments of the present disclosure. The method 900, at block B902, may include receiving image data obtained using one or more image sensors of a machine, the image data representing a real-world image of an environment. For instance, the fusion component(s) 114 may receive the sensor data 104 obtained using the sensor(s) 102 of the machine. As described herein, the sensor data 104 may represent a real image of the environment for which the machine is navigating. Additionally, in some examples, the environment may include a low lighting condition such that the real image represents a low level of light.

The method 900, at block B904, may include obtaining, using a simulated environment associated with the environment, simulation data representing a simulated image of the environment. For instance, the fusion component(s) 114 may obtain the simulated data 112 that is generated using the simulated environment 108. As described herein, the simulated data 112 may represent the simulated image that corresponds to the real image. For instance, the alignment component(s) 110 may have aligned the simulated image with respect to the real image. Additionally, in some examples, the simulated environment 108 may include an optimal lighting condition such that the simulated image represents an optimal level of light.

The method 900, at block B906, may include determining a first weight associated with the real-world image and a second weight associated with the simulated image. For instance, the fusion component(s) 114 may determine the first weight 120 to apply to the real image and the second weight 120 to apply to the simulated image using one or more techniques. For example, the fusion component(s) 114 may determine the weights 120 as including set weights 120, based on inputs from users setting the weights 120, and/or based on feedback from the feedback component(s) 124. In some examples, the fusion component(s) 114 may further determine one or more weights 120 to apply to one or more portions of the real image and/or one or more portions of the simulated image.

The method 900, at block B908, may include generating, based at least on blending the real-world image with the simulated image using the first weight and the second weight, a blended image of the environment. For instance, the fusion component(s) 114 may generate the blended image by blending the real image with the simulated image using the first weight 120 and the second weight 120. As described herein, in some examples, the fusion component(s) 114 may generate the blended image by applying the first weight 120 to pixel values of the real image, applying the second weight 120 to the pixel values of the simulated image, and then combining the pixel values as updated.

The method 900, at block B910, may include causing the machine to perform one or more operations based at least on the blended image. For instance, the fusion component(s) 114 may send the blended data 118 representing the blended image to the processing component(s) 122 of the machine. As described herein, the processing component(s) 122 may be configured to perform one or more tasks, such as object detection, object classification, object motion prediction, machine localization, trajectory planning, and/or any other type of task. As such, the processing component(s) 122 may process the blended data 118 in order to perform the task(s).

FIG. 10 illustrates a flow diagram showing a method 1000 for using feedback to update image fusion, in accordance with some embodiments of the present disclosure. The method 1000, at block B1002, may include generating one or more first blended images by blending one or more first real images with one or more first simulated images using one or more characteristics. For instance, the fusion component(s) 114 may generate the first blended image(s) by blending the first real image(s) with the first simulated image(s) using the characteristic(s). As described herein, in some examples, the characteristic(s) may include one or more first weights 120 to apply to the first real image(s) and/or one or more second weights 120 to apply to the first simulated image(s).

The method 1000, at block B1004, may include determining, based at least on one of sensor data or outputs from processing the one or more first blended images, one or more updated characteristics. For instance, the feedback component(s) 124 may determine the updated characteristic(s) using the sensor data 104 and/or the outputs from the processing component(s) 122 processing the first blended image(s). As described herein, determining the updated characteristic(s) may include increasing the first weight(s) 120 applied to real images while decreasing the second weight(s) applied to simulated images and/or decreasing the first weight(s) 120 applied to real images while increasing the second weight(s) 120 applied to simulated images.

The method 1000, at block B1006, may include generating one or more second blended images by blending one or more second real images with one or more second simulated images using the one or more updated characteristics. For instance, the fusion component(s) 114 may generate the second blended image(s) by blending the second real image(s) with the second simulated image(s) using the updated characteristic(s). In some examples, the method 1000 may then continue to repeat such that the feedback component(s) 124 is able to continue updating the characteristic(s) in order to increase the quality of blended images. As described herein, increasing the quality of the blended images may further increase the accuracy of the processing component(s) 122 that process the blended images.

FIG. 11 illustrates a flow diagram showing a method 1100 for blending a real image with a simulated image to generate a blended image, in accordance with some embodiments of the present disclosure. The method 1100, at block B1102, may include applying one or more first weights to first pixels of a real image to determine first updated values. For instance, the fusion component(s) 114 may apply the first weight(s) 120 to the first pixels of the real image to determine the first updated values. As described herein, in some examples, the fusion component(s) 114 may apply the same first weight 120 to all of the first values. However, in other examples, the fusion component(s) 114 may apply different first weights 120 to different portions of the first values.

The method 1100, at block B1104, may include applying one or more second weights to second pixels of a simulated image to determine second updated values. For instance, the fusion component(s) 114 may apply the second weight(s) 120 to the second pixels of the simulated image to determine the second updated values. As described herein, in some examples, the fusion component(s) 114 may apply the same second weight 120 to all of the second values. However, in other examples, the fusion component(s) 114 may apply different second weights 120 to different portions of the second values.

The method 1100, at block B1106, may include generating a blended image based at least on the first updated values and the second updated values. For instance, the fusion component(s) 114 may generate the blended image using the first updated values and the second updated values. As described herein, in some examples, the fusion component(s) 114 may determine third values by combining the first updated values and the second updated values. The fusion component(s) 114 may then use the third values for third pixels of the blended image.

Example Autonomous Vehicle

Figure 12A:
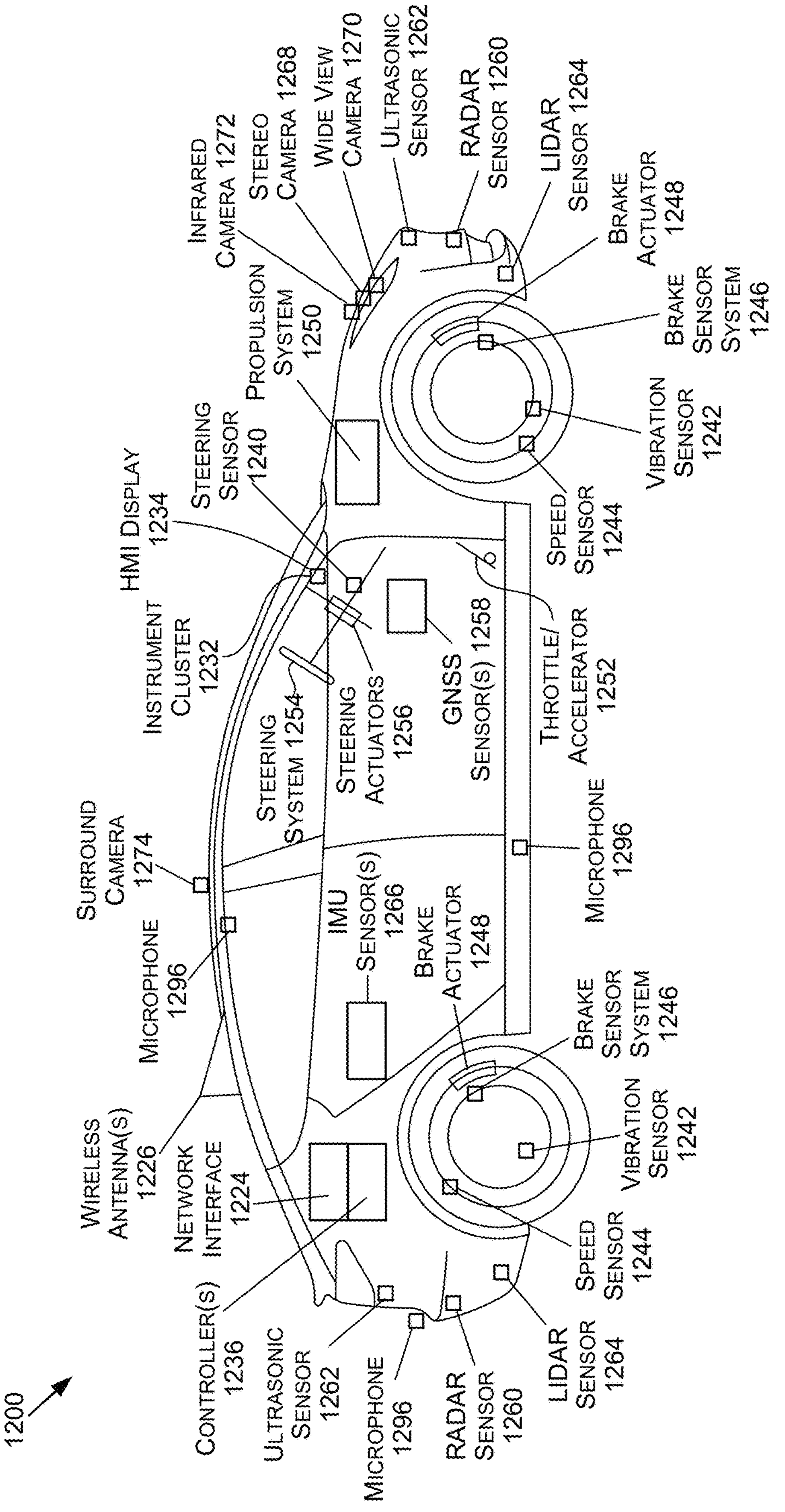
FIG. 12A is an illustration of an example autonomous vehicle, in accordance with some embodiments of the present disclosure.

FIG. 12A is an illustration of an example autonomous vehicle 1200, in accordance with some embodiments of the present disclosure. The autonomous vehicle 1200 (alternatively referred to herein as the "vehicle 1200") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J 3016-201806, published on Jun. 15, 2018, Standard No. J 3016-201609, published on Sep. 30, 2016, and previous and future versions of this standard). The vehicle 1200 may be capable of functionality in accordance with one or more of Level 3-Level 5 of the autonomous driving levels. The vehicle 1200 may be capable of functionality in accordance with one or more of Level 1-Level 5 of the autonomous driving levels. For example, the vehicle 1200 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle

1200 or other machine, such as being fully autonomous, being highly autonomous, being conditionally autonomous, being partially autonomous, providing assistive autonomy, being semi-autonomous, being primarily autonomous, or other designation.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems ("GNSS") sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the High Definition ("HD") map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1224 which may use one or more wireless antenna(s) 1226 and/or modem(s) to communicate over one or more networks. For example, the network interface 1224 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1226 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 12B:
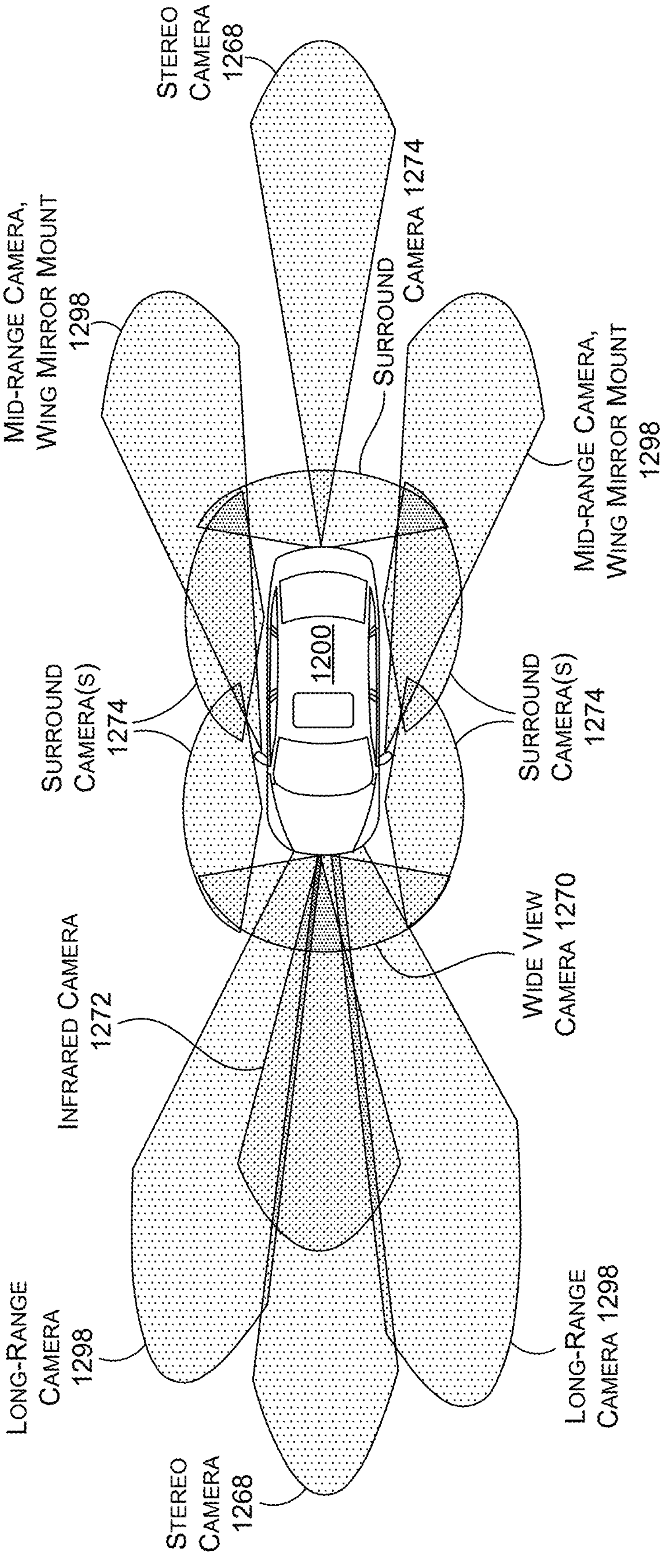
FIG. 12B is an example of camera locations and fields of view for the example autonomous vehicle of FIG. 12A, in accordance with some embodiments of the present disclosure.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may be any number (including zero) of wide-view cameras 1270 on the vehicle 1200. In addition, any number of long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

Any number of stereo cameras 1268 may also be included in a front-facing configuration. In at least one embodiment, one or more of stereo camera(s) 1268 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

Figure 12C:
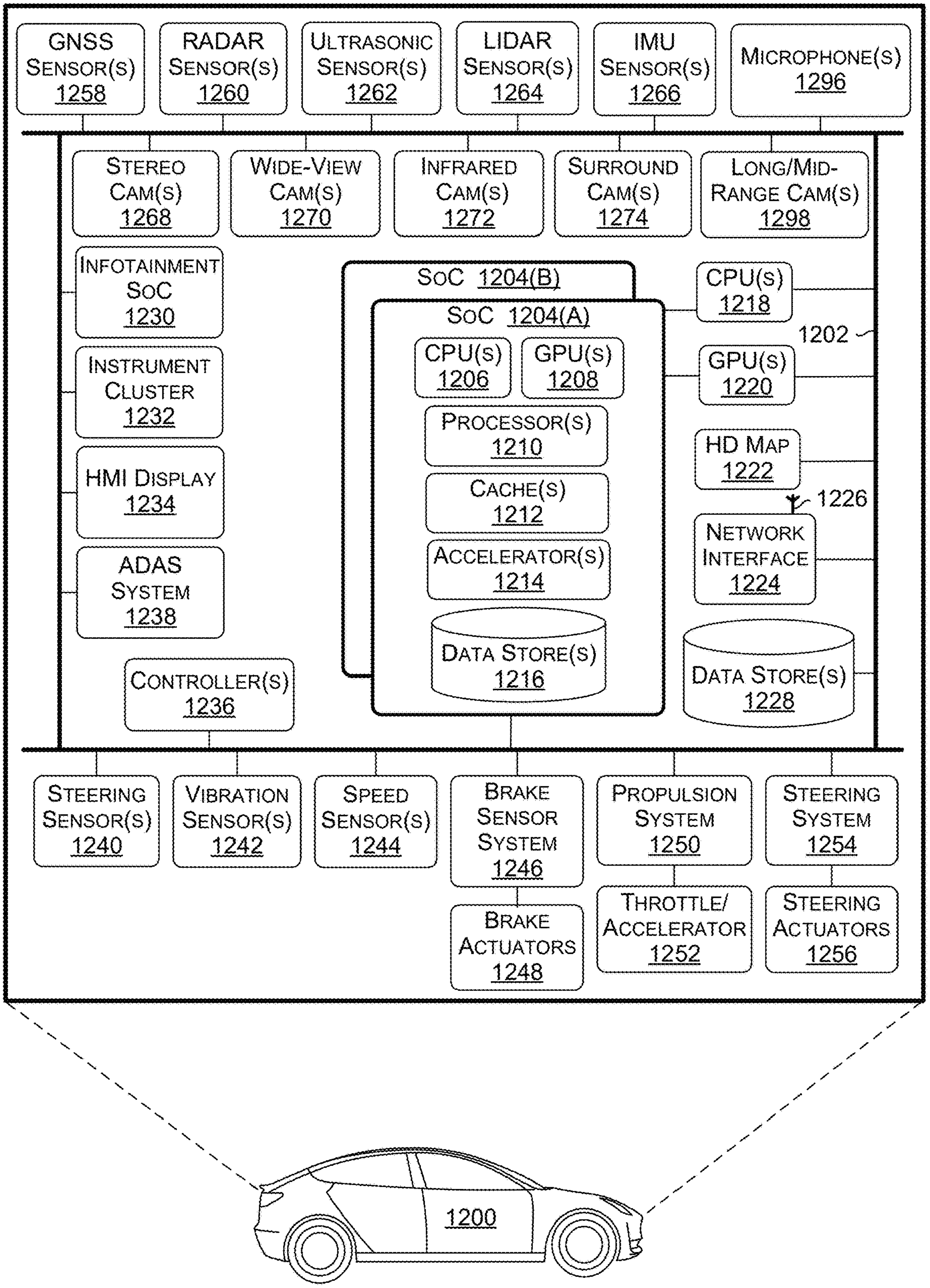
FIG. 12C is a block diagram of an example system architecture for the example autonomous vehicle of FIG. 12A, in accordance with some embodiments of the present disclosure.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF 64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include an arithmetic logic unit(s) (ALU(s)) which may be leveraged in performing processing with respect to any of the variety of tasks or operations of the vehicle 1200—such as processing DNNs. In addition, the SoC(s) 1204 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1206 and/or GPU(s) 1208.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link.

The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS, assisted GPS sensors, differential GPS (DGPS) sensors, etc.), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 120-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 12D:
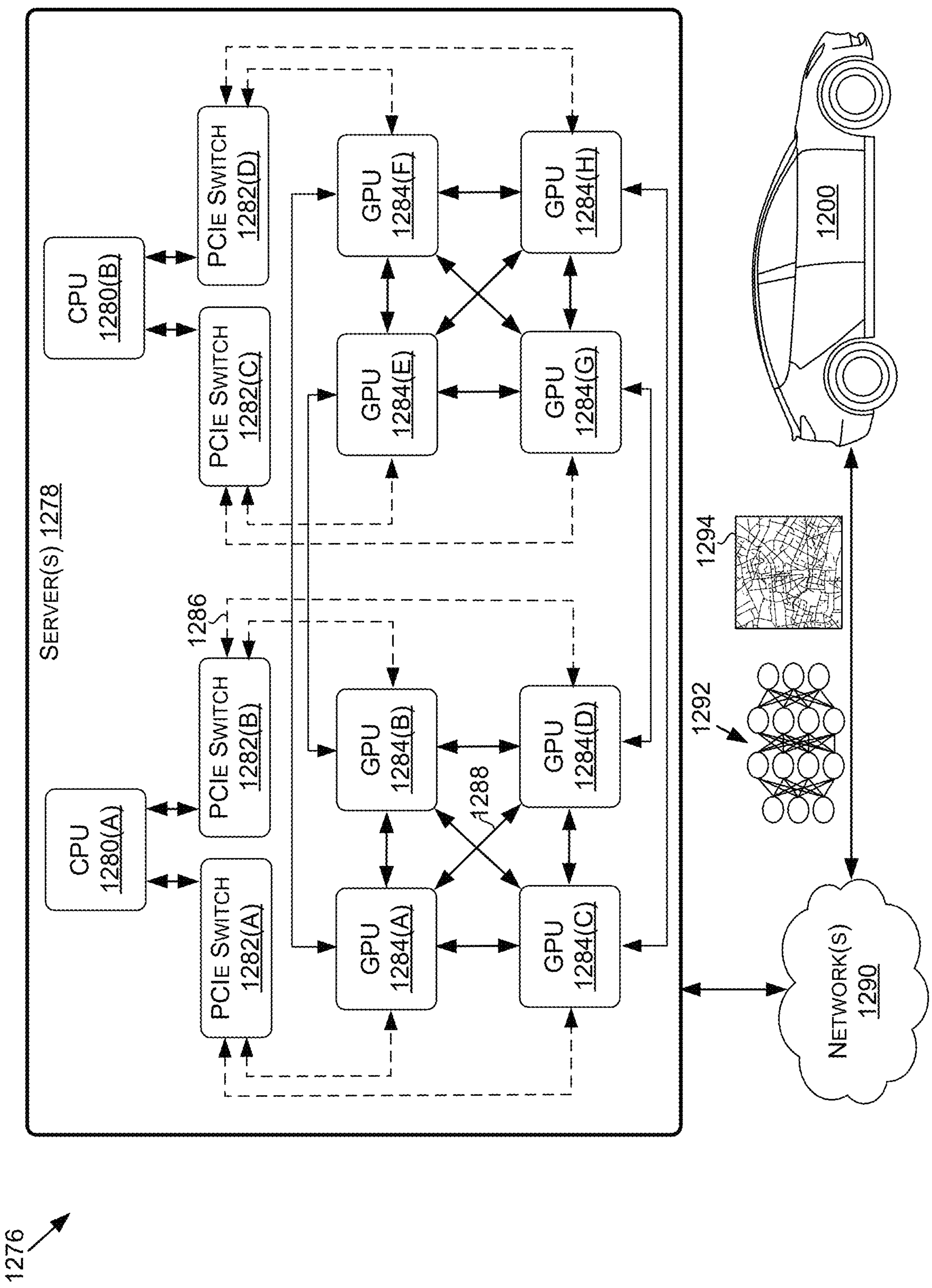
FIG. 12D is a system diagram for communication between cloud-based server(s) and the example autonomous vehicle of FIG. 12A, in accordance with some embodiments of the present disclosure.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H) (collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 13:
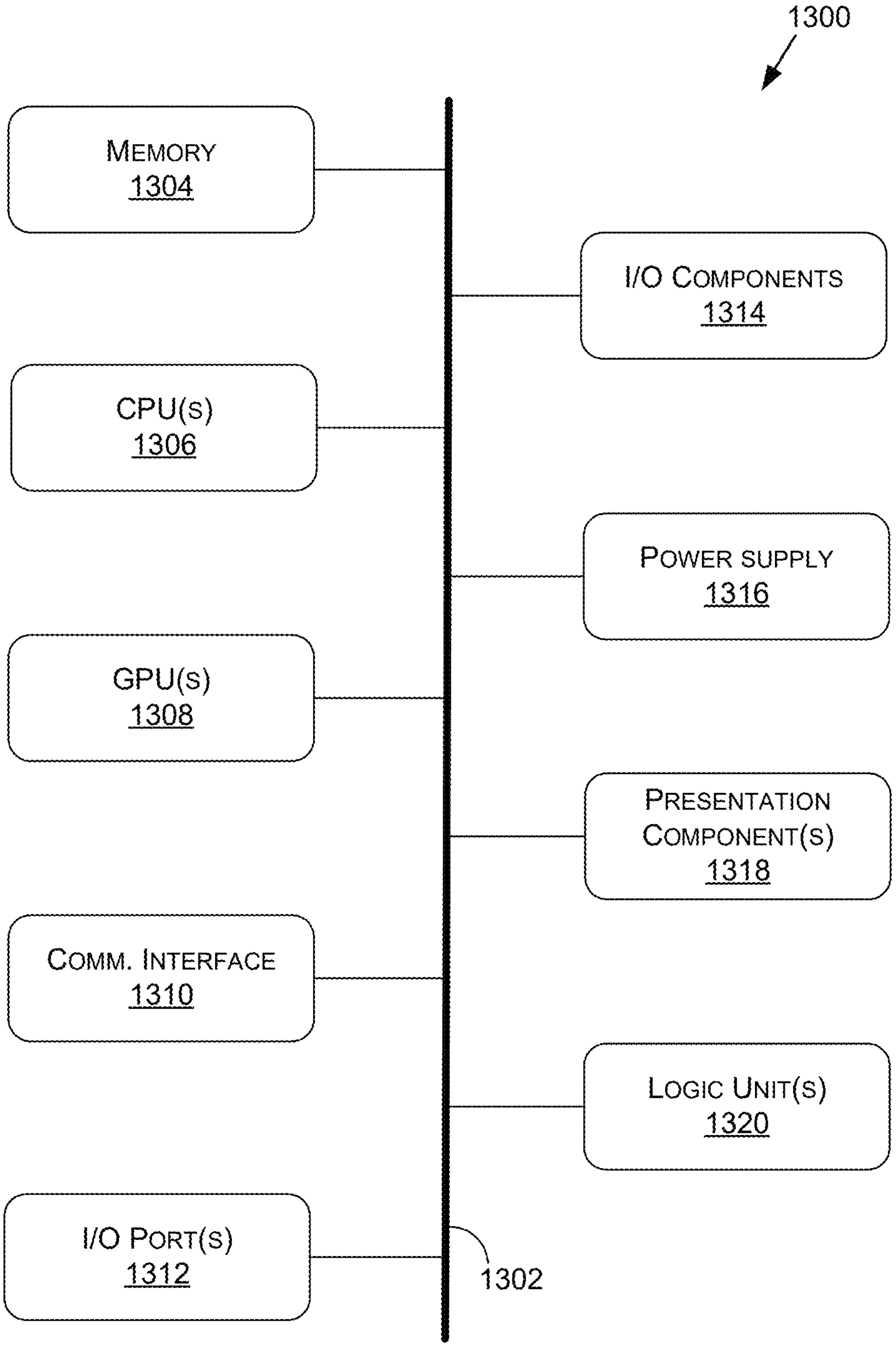
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a simulated image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
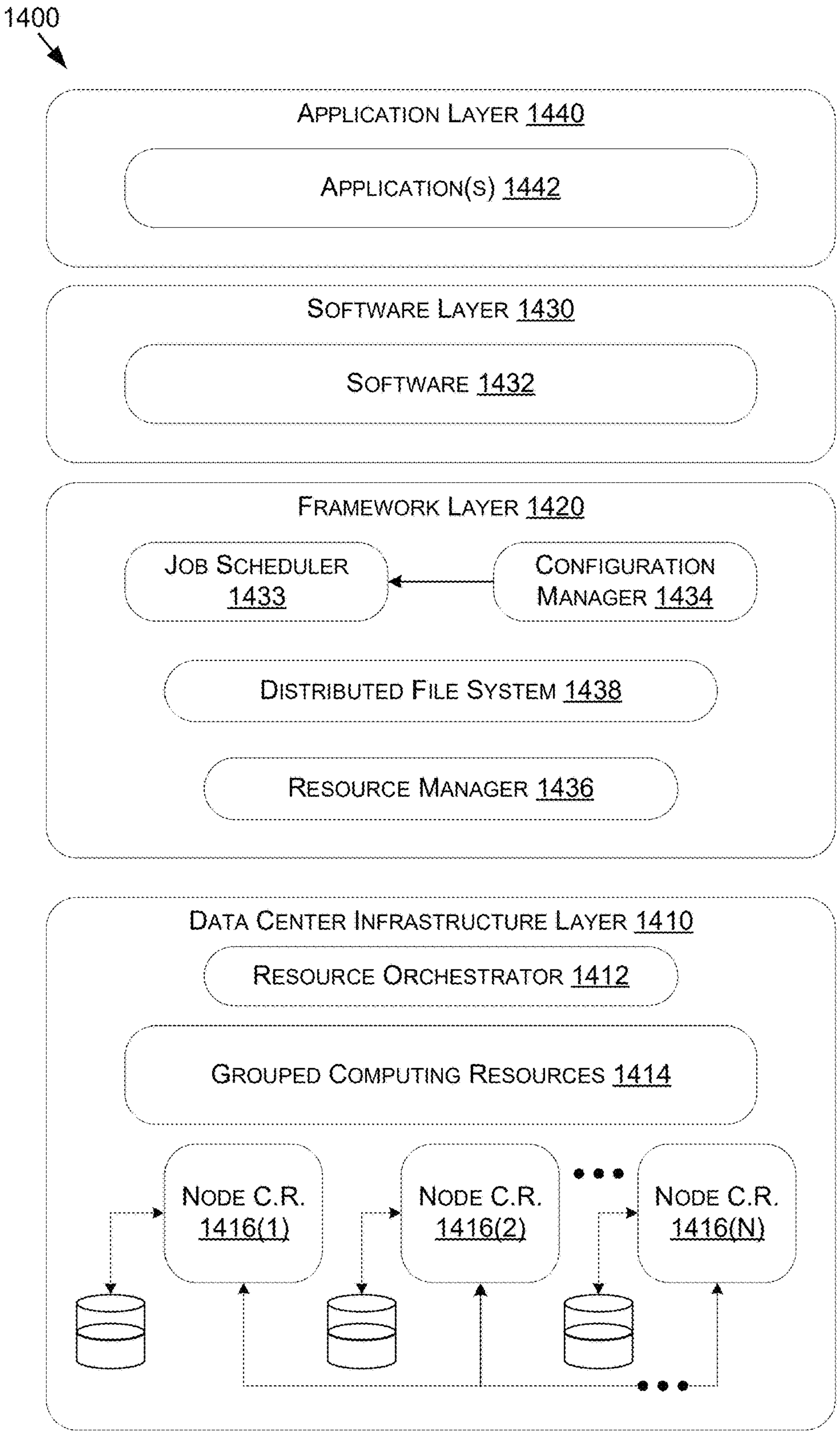
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1433, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1433 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1433. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE CLAUSES

A: A method comprising: receiving image data obtained using one or more image sensors of a machine, the image data representing a real-world image of a portion of an environment; obtaining, using a digital twin simulation associated with the environment, simulation data representing a simulated image corresponding to at least the portion of the environment; determining a first weight associated with the real-world image and a second weight associated with the simulated image; generating, based at least on blending the real-world image with the simulated image using the first weight and the second weight, a blended image of the environment; and causing the machine to perform one or more operations based at least on the blended image.

B: The method of paragraph A, wherein: the real-world image is associated with a first level of lighting; the simulated image is associated with a second level of lighting that is greater than the first level of lighting; and the blended image is associated with a third level of lighting that is less than or equal to the second level of lighting but greater than the first level of lighting.

C: The method of either paragraph A or paragraph B, wherein the generating the blended image of the environment comprises: applying the first weight to first values associated with first pixels of the real-world image; applying the second weight to second values associated with second pixels of the simulated image; determining, based at least on the applying the first weight to the first values and the applying the second weight to the second values, third values associated with third pixels of the blended image; and generating the blended image using at least the third values associated with the third pixels.

D: The method of any one of paragraphs A-C, further comprising: aligning the simulated image with respect to the real-world image, wherein the generating the blended image of the environment is further based at least on the simulated image being aligned with respect to the real-world image.

E: The method of any one of paragraphs A-D, further comprising: determining, based at least on the one or more operations, a third weight associated with a second real-world image of the environment and a fourth weight associated with a second simulated image of the environment; and generating, based at least on blending the second real-world image with the second simulated image using the third weight and the fourth weight, a second blended image of the environment.

F: The method of any one of paragraphs A-E, further comprising: obtaining sensor data generated using one or more sensors of the machine, the sensor data representing a level of light associated with the environment, wherein the determining the first weight associated with the real-world image and the second weight associated with the simulated image is based at least on the level of light.

G: The method of any one of paragraphs A-F, wherein the causing the machine to perform the one or more operations comprises at least one of: causing the machine to process the blended image using one or more machine learning models; or causing the machine to navigate within the environment using the blended image.

H: A system comprising: one or more processors to: obtain image data obtained using one or more image sensors of a machine, the image data representing a real image of an environment; obtain, using a simulation associated with the environment, simulation data representing a simulated image of the environment; generate, based at least on blending the real image with the simulated image, a blended image of the environment; and cause the machine to perform one or more operations based at least on the blended image.

I: The system of paragraph H, wherein: the real image is associated with a first level of lighting; the simulated image is associated with a second level of lighting that is greater than the first level of lighting; and the blended image is associated with a third level of lighting that greater than the first level of lighting and less than or equal to the second level of lighting.

J: The system of either paragraph H or paragraph I, wherein the one or more processors are further to: generate, based at least on sensor data obtained using one or more sensors associated with the environment, the simulation associated with the environment; and adding one or more virtual light sources to the simulation in order to increase a level of light associated with the simulation.

K: The system of any one of paragraphs H-J, wherein the one or more processors are further to: determine a first weight associated with the real image and a second weight associated with simulated image, wherein the blended image is further generated based at least on the first weight and the second weight.

L: The system of paragraph K, wherein the generation of the blended image of the environment comprises: applying the first weight to first values associated with first pixels of the real image; applying the second weight to second values associated with second pixels of the simulated image; determining, based at least on the applying the first weight to the first values and the applying the second weight to the second values, third values associated with third pixels of the simulated image; and generating the simulated image using at least the third values associated with the third pixels.

M: The system of paragraph K, wherein the one or more processors are further to: determine a performance associated with the machine performing one or more previous operations associated with one or more second blended images, wherein the first weight associated with the real image and the second weight associated with the simulated image are determined based at least on the performance.

N: The system of paragraph K, wherein the one or more processors are further to: receive sensor data obtained using one or more sensors of at least one of the machine or the environment, the sensor data representing a level of light associated with the environment, wherein the first weight associated with the real image and the second weight associated with the simulated image are determined based at least on the level of light.

O: The system of any one of paragraphs H-N, wherein the one or more processors are further to: align the simulated image with respect to the real image, wherein the blended image of the environment is further generated based at least on the simulated image being aligned with respect to the real image.

P: The system of any one of paragraphs H-O, wherein the causation of the machine to perform the one or more operations comprises at least one of: causing the machine to process the blended image using one or more machine learning models of the machine; or causing the machine to navigate within the environment using the blended image.

Q: The system of any one of paragraphs H-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; systems implementing one or more multi-modal language models; systems using or deploying one or more inference microservices; systems that incorporate deploy one or more machine learning models in a service or microservice along with an OS-level virtualization package (e.g., a container); a system incorporating one or more virtual machines (VMs); a system implemented at least partially in a data center; or a system implemented at least partially using cloud computing resources.

R: One or more processors comprising: processing circuitry to cause a machine to perform one or more operations based at least on one or more blended images of an environment, wherein the one or more blended images are generated based at least on blending one or more real-world images of the environment with one or more simulated images of the environment using one or more first weights associated with the one or more real-world images and one or more second weights associated with the one or more simulated images.

S: The one or more processors of paragraph R, wherein the processing circuitry is further to determine at least one of the one or more first weights associated with the one or more real-world images or the one or more second weights associated with the one or more simulated images based at least on at least one of: a performance of the machine performing one or more previous operations based at least on one or more second blended images; or sensor data obtained using one or more sensors of the machine.

T: The one or more processors of either paragraphs R or paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system that provides one or more cloud gaming applications; a system for performing one or more deep learning operations; a system implemented using an edge device; a system implemented using a robot; a system for performing one or more generative AI operations; a system for performing operations using one or more large language models (LLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; systems implementing one or more multi-modal language models; systems using or deploying one or more inference microservices; systems that incorporate deploy one or more machine learning models in a service or microservice along with an OS-level virtualization package (e.g., a container); a system incorporating one or more virtual machines (VMs); a system implemented at least partially in a data center; or a system implemented at least partially using cloud computing resources.

What is claimed is:

1. A method comprising:

receiving image data obtained using one or more image sensors of a machine, the image data representing a real-world image of a portion of an environment;

obtaining, using a digital twin simulation associated with the environment, simulation data representing a simulated image corresponding to at least the portion of the environment;

determining a first weight associated with the real-world image and a second weight associated with the simulated image;

generating, based at least on blending the real-world image with the simulated image using the first weight and the second weight, a blended image of the environment;

processing the blended image using one or more machine learning models of a machine; and causing, based at least on the processing the blended image, the machine to navigate within the environment.

2. The method of claim 1, wherein:

the real-world image is associated with a first level of lighting;

the simulated image is associated with a second level of lighting that is greater than the first level of lighting; and the blended image is associated with a third level of lighting that is less than or equal to the second level of lighting but greater than the first level of lighting.

3. The method of claim 1, wherein the generating the blended image of the environment comprises:

applying the first weight to first values associated with first pixels of the real-world image;

applying the second weight to second values associated with second pixels of the simulated image;

determining, based at least on the applying the first weight to the first values and the applying the second weight to the second values, third values associated with third pixels of the blended image; and generating the blended image using at least the third values associated with the third pixels.

4. The method of claim 1, further comprising:

aligning the simulated image with respect to the real-world image, wherein the generating the blended image of the environment is further based at least on the simulated image being aligned with respect to the real-world image.

5. The method of claim 1, further comprising:

determining a third weight associated with a second real-world image of the environment and a fourth weight associated with a second simulated image of the environment; and generating, based at least on blending the second real-world image with the second simulated image using the third weight and the fourth weight, a second blended image of the environment.

6. The method of claim 1, further comprising:

obtaining sensor data obtained using one or more sensors of the machine, the sensor data representing a level of light associated with the environment, wherein the determining the first weight associated with the real-world image and the second weight associated with the simulated image is based at least on the level of light.

7. The method of claim 1, wherein the one or more machine learning models are associated with at least one of object detection, object classification, machine localization, or trajectory planning.

8. A system comprising:

one or more processors to:

obtain image data obtained using one or more image sensors of a machine, the image data representing a real-world image of an environment;

obtain, using a simulation associated with the environment, simulation data representing a simulated image of the environment;

generate, based at least on blending the real-world image with the simulated image, a blended image of the environment;

process the blended image using one or more machine learning models of a machine; and cause, based at least on the blended image being processed, the machine to navigate within the environment.

9. The system of claim 8, wherein:

the real-world image is associated with a first level of lighting;

the simulated image is associated with a second level of lighting that is greater than the first level of lighting; and the blended image is associated with a third level of lighting that greater than the first level of lighting and less than or equal to the second level of lighting.

10. The system of claim 8, wherein the one or more processors are further to:

generate, based at least on sensor data obtained using one or more sensors associated with the environment, the simulation associated with the environment; and adding one or more virtual light sources to the simulation in order to increase a level of light associated with the simulation.

11. The system of claim 8, wherein the one or more processors are further to:

determine a first weight associated with the real-world image and a second weight associated with simulated image, wherein the blended image is further generated based at least on the first weight and the second weight.

12. The system of claim 11, wherein the generation of the blended image of the environment comprises:

applying the first weight to first values associated with first pixels of the real-world image;

applying the second weight to second values associated with second pixels of the simulated image;

determining, based at least on the applying the first weight to the first values and the applying the second weight to the second values, third values associated with third pixels of the simulated image; and generating the simulated image using at least the third values associated with the third pixels.

13. The system of claim 11, wherein the one or more processors are further to:

determine a performance associated with the machine performing one or more previous operations associated with one or more second blended images, wherein the first weight associated with the real-world image and the second weight associated with the simulated image are determined based at least on the performance.

14. The system of claim 11, wherein the one or more processors are further to:

receive sensor data obtained using one or more sensors of at least one of the machine or the environment, the sensor data representing a level of light associated with the environment, wherein the first weight associated with the real-world image and the second weight associated with the simulated image are determined based at least on the level of light.

15. The system of claim 8, wherein the one or more processors are further to:

align the simulated image with respect to the real-world image, wherein the blended image of the environment is further generated based at least on the simulated image being aligned with respect to the real-world image.

16. The system of claim 8, wherein the one or more machine learning models are associated with at least one of object detection, object classification, machine localization, or trajectory planning.

17. The system of claim 8, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system that provides one or more cloud gaming applications;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing operations using one or more multi-modal language models;

a system for performing one or more conversational AI operations;

a system for generating synthetic data;

a system for presenting at least one of virtual reality content, augmented reality content, or mixed reality content;

systems implementing one or more multi-modal language models;

systems using or deploying one or more inference micro-services;

systems that incorporate deploy one or more machine learning models in a service or microservice along with an OS-level virtualization package (e.g., a container);

a system incorporating one or more virtual machines (VMs);

a system implemented at least partially in a data center; or a system implemented at least partially using cloud computing resources.

18. One or more processors comprising:

processing circuitry to cause a machine to navigate within an environment based at least on processing one or more blended images of an environment using one or more machine learning models of the machine, wherein the one or more blended images are generated based at least on blending one or more real-world images of the environment with one or more simulated images of the environment using one or more first weights associated with the one or more real-world images and one or more second weights associated with the one or more simulated images.

19. The one or more processors of claim 18, wherein the processing circuitry is further to determine at least one of the one or more first weights associated with the one or more real-world images or the one or more second weights associated with the one or more simulated images based at least on at least one of:

a performance of the machine performing one or more previous operations based at least on one or more second blended images; or sensor data obtained using one or more sensors of the machine.

20. The one or more processors of claim 18, wherein the one or more processors are comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system that provides one or more cloud gaming applications;

a system for performing one or more deep learning operations;

a system implemented using an edge device;

a system implemented using a robot;

a system for performing one or more generative AI operations;

a system for performing operations using one or more large language models (LLMs);

a system for performing operations using one or more vision language models (VLMs);

a system for performing operations using one or more multi-modal language models;

a system for performing one or more conversational AI operations;

a system for generating synthetic data;

a system for presenting at least one of virtual reality content, augmented reality content, or mixed reality content;

systems implementing one or more multi-modal language models;

systems using or deploying one or more inference micro-services;

systems that incorporate deploy one or more machine learning models in a service or microservice along with an OS-level virtualization package (e.g., a container);

a system incorporating one or more virtual machines (VMs);

a system implemented at least partially in a data center; or a system implemented at least partially using cloud computing resources.

* * * * *